US012786192B2

(12) United States Patent
Bhavsar et al.

(10) Patent No.: US 12,786,192 B2
(45) Date of Patent: Nov. 3, 2026

(54) DATA EXCHANGE COORDINATION FOR SERVICE CLAIM PROCESSING

(71) Applicant: Sandata Technologies, LLC, Hicksville, NY (US)

(72) Inventors: Vrajesh Bhavsar, Brentwood, TN (US); John Kalivas, Erie, CO (US); Sanju Melitta Pratap, Brentwood, TN (US); Robert Stokes, Franklin, TN (US)

(73) Assignee: Sandata Technologies, LLC, Hicksville, NY (US)

( * ) Notice: Subject to any disclaimer, the term of this patent is extended or adjusted under 35 U.S.C. 154(b) by 0 days.

(21) Appl. No.: 18/884,531

(22) Filed: Sep. 13, 2024

(65) Prior Publication Data

US 2025/0193190 A1 Jun. 12, 2025

Related U.S. Application Data

(63) Continuation-in-part of application No. 18/799,721, filed on Aug. 9, 2024, which is a continuation of application No. 18/534,079, filed on Dec. 8, 2023, now Pat. No. 12,113,793.

(51) Int. Cl.
*H04L 9/40* (2022.01)

(52) U.S. Cl.
CPC .......... *H04L 63/0892* (2013.01); *H04L 63/10* (2013.01)

(58) Field of Classification Search
CPC ..... G06Q 40/08; H04L 63/08; H04L 63/0823; H04L 63/0892; H04L 63/10; H04L 63/101
See application file for complete search history.

(56) References Cited

U.S. PATENT DOCUMENTS

| | | | | |
|---|---|---|---|---|
| 10,706,476 | B2 * | 7/2020 | Niemeyer | G16H 10/60 |
| 10,929,935 | B1 | 2/2021 | Frankenfield et al. | |
| 11,704,742 | B2 | 7/2023 | Frankenfield | |
| 12,113,793 | B1 | 10/2024 | Bhavsar et al. | |
| 12,489,752 | B2 | 12/2025 | Bhavsar et al. | |
| 2005/0222875 | A1 * | 10/2005 | Lordeman | G07F 7/1008 705/3 |
| 2005/0288972 | A1 * | 12/2005 | Marvin | G06Q 20/14 705/4 |
| 2014/0046678 | A1 * | 2/2014 | Lacy | G06Q 40/08 705/2 |
| 2014/0278512 | A1 * | 9/2014 | Young | G16H 10/60 705/2 |
| 2014/0297297 | A1 | 10/2014 | Head | |

(Continued)

*Primary Examiner* — Jeong S Park

(74) *Attorney, Agent, or Firm* — Norton Rose Fulbright US LLP

(57) ABSTRACT

This disclosure provides systems, methods, and apparatuses, including computer programs encoded on computer storage media, to coordinate data exchange among a plurality of devices. In one aspect, a method is provided that includes receiving first verification data and a request from a service server, determining claim information for a payer based on the first verification data, sending the claim information to a client server, receiving an acknowledgment from the client server, and sending the acknowledgment to the service server. Additional aspects include handling payment information, verifying service completion, and converting data formats. Other aspects and features are also claimed and described.

19 Claims, 9 Drawing Sheets

(56) References Cited

U.S. PATENT DOCUMENTS

| | | | | |
|---|---|---|---|---|
| 2016/0321410 | A1* | 11/2016 | Timmerman | G16H 20/10 |
| 2017/0351824 | A1* | 12/2017 | DeGasperis | G06Q 20/102 |
| 2018/0121843 | A1* | 5/2018 | Connely, IV | G16H 40/67 |
| 2018/0247022 | A1 | 8/2018 | Kaminsky | |
| 2019/0102397 | A1 | 4/2019 | Hornkvist et al. | |
| 2019/0244700 | A1 | 8/2019 | Aganyan et al. | |
| 2019/0273807 | A1 | 9/2019 | Mimran | |
| 2019/0318431 | A1* | 10/2019 | Niemeyer | G16H 10/60 |
| 2020/0226690 | A1* | 7/2020 | Gulati | G06Q 40/08 |
| 2020/0279339 | A1 | 9/2020 | Akutagawa et al. | |
| 2020/0311823 | A1* | 10/2020 | D'Abbene | G16H 50/70 |
| 2021/0012894 | A1 | 1/2021 | Zelocchi | |
| 2021/0117973 | A1 | 4/2021 | Lv | |
| 2022/0172192 | A1 | 6/2022 | Lee | |
| 2023/0145530 | A1 | 5/2023 | Manka et al. | |
| 2023/0290523 | A1 | 9/2023 | Hall et al. | |
| 2024/0006083 | A1 | 1/2024 | Singer et al. | |
| 2024/0062869 | A1 | 2/2024 | Rosenberg et al. | |
| 2025/0080523 | A1 | 3/2025 | Jain et al. | |

* cited by examiner

DATA EXCHANGE COORDINATION FOR SERVICE CLAIM PROCESSING

CROSS-REFERENCE TO RELATED APPLICATIONS

The present application is a continuation-in-part application of and claims priority to U.S. patent application Ser. No. 18/799,721, filed on Aug. 259, 2024, which is a continuation application of U.S. patent application Ser. No. 18/534,079, filed on Dec. 8, 2023, the disclosures of which are incorporated herein by reference for all purposes.

TECHNICAL FIELD

Aspects of the present disclosure relate generally to data processing systems, and more particularly, to systems configured to facilitate data coordination among a plurality of devices, such as devices of different entities. Some features may enable and provide enhanced interoperability, improved data processing efficiency, and reduced overall energy consumption.

INTRODUCTION

Data is the foundation of the 21st century economy. Typically, massive volumes of data are exchanged among a plurality of different devices and device types. However, in some cases, a speed with which these data exchanges may be effectuated is impeded by lack of interoperability among one or more of the devices, thereby leading to systemic inefficiencies. For example, in the context of provision of services, a first device associated with first party may send an authorization to authorize a service, a second party may perform the authorized service in response to receipt of the authorization at a second device associated with the second party, and a third party may confirm performance of the service and settle payment for the authorized service through a third device associated with the third party. Each of the first device, the second device, and the third device may use its own data formats, data types, data protocols, and the like, one or more of which may be incompatible with another device, thereby introducing inefficiencies associated with lack of device interoperability.

Additional complexity may be introduced by verification data associated with verifying that a service has, in fact, been performed, which may identify instances of fraud. For instance, verification data may include private personal information (PPI), such as geolocation data indicating a location of a site at which the service was performed and identification information identifying personnel who performed the service, identifying for whom the service was performed, or both, Further, the verification data may include service data identifying the type of service performed, which itself may be sensitive or private, especially in the context of provision of medical services. Accordingly, providing appropriate data and cyber security safeguards around this type of verification data, while sharing the data among a plurality of parties, may add to complexity of data processing systems to facilitate provision of services.

Illustrative of these problems is the provision of medical services or another service that may be covered (e.g., paid), at least in part, by a third party, such as an insurance provider. In the medical service context, an authorizing party, typically a clinician, authorizes performance of a medical service. A paying party, usually an insurer, such as a health insurance company, pays for performance of the authorized service after the service has been verifiably performed. A service provider provides the service in response to receipt of authorization from the authorizing party, the insurer, or both.

In some cases, the provider provides the service in a patient's home such that verification that the service has been performed typically is generated and submitted to the payer (e.g., the insurer). This verification information usually takes the form of electronic visit verification (EVV) data. Indeed, in the United States of America, the 21st Century Cures Act currently requires that each claim for services performed at a patient's home is electronically verified at the point of care. Accordingly, in the context of provision of home health services, a plurality of different data types, different data encodings, different data formats, different data protocols, or the like may be generated by devices associated one or more parties involved in facilitating provision of the authorized service, and this data is exchanged by one or more of the devices associated with the parties to verify performance of the authorized service and/or to effectuate payment for the authorized service. This proliferation of different data types, different data encodings, different data formats, different data protocols, or a combination thereof, over large volumes of exchanged data, may lead to processing delays, increased memory usage, increased energy usage associated with storing and processing these disparate data types, and the like.

Additionally, extraneous data may be included among data sent and received to facilitate provision of services. This extraneous data may be unhelpful in facilitating the services, may be unnecessary to facilitate provision of the services, or both. Over a large volume of provided services, inclusion of extraneous data may exacerbate these processing delays, increased memory usage, and increased energy usage associated with the proliferation of data in the service context.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A first aspect provides a method performed by a coordination server to coordinate data exchange among a plurality of devices. The method includes receiving, from a service server, first verification data and a request. The first verification data is associated with performance of the service, and the request includes a request for payment for performance of the service. The method also includes determining, based on the first verification data, claim information for a payer associated with payment for performance of the service. The method also includes sending the claim information to a client server associated with the payer; receiving, from the client server in response to the claim information, an acknowledgment of the claim information; and sending, to the service server, the acknowledgment.

In a second aspect, in combination with the first aspect, the method further includes receiving, from the client server, payment information, wherein the payment information indicates that payment has been processed for performance of the service; and sending, to the service server, the payment information.

In a third aspect, in combination with one or more of the first aspect through the second aspect, the method further includes receiving, from the client server, acknowledgment that performance of the service was completed, wherein the claim information is determine based on receiving the acknowledgment.

In a fourth aspect, in combination with one or more of the first aspect through the third aspect, the first verification includes an authorization identifier for the service, wherein the claim information includes the authorization identifier for the service.

In a fifth aspect, in combination with the fourth aspect, the claim information includes a service identifier for the service, one or more dates of performance of the service, one or more durations of performance of the service, one or more billing units for the service, a payer format associated with the payer, an identifier of a provider of the service, an identifier of a client of the service, or a combination thereof.

In a sixth aspect, in combination with one or more of the first aspect through the fifth aspect, determining the claim information includes determining a number of authorized units of the service have been performed based on the first verification data.

In a seventh aspect, in combination with one or more of the first aspect through the sixth aspect, the method further includes verifying, based on the first verification data, that at least a portion of the service has been completed, and wherein the claim information is determined in response to determining that at least the portion of the service has been completed.

In an eighth aspect, in combination with one or more of the first aspect through the seventh aspect, a first formatting, a first encoding, or both of the first verification data is different from a second formatting, a second encoding, or both of the claim information. Determining the claim information includes converting at least a portion of the first verification into the second formatting, the second encoding, or a combination thereof.

In a ninth aspect, in combination with the eighth aspect, the method further includes determining the payer based on the first verification data; and selecting the second formatting, the second encoding, or both based on the payer.

In a tenth aspect, in combination with one or more of the eighth aspect through the ninth aspect, the acknowledgment is in the second formatting, the second encoding, or both. Sending the acknowledgment to the service server includes determining a modified acknowledgment in the first formatting, the first formatting, or both; and sending the modified acknowledgment to the service server.

In an eleventh aspect, in combination with one or more of the first aspect through the tenth aspect, determining the claim information and sending the claim information to the client server is performed in real time after receiving the first verification data.

In a twelfth aspect, in combination with one or more of the first aspect through the eleventh aspect, the first verification data includes verification for a plurality of services, and determining the claim information includes determining separate claim information for each of the plurality of services.

A thirteenth aspect provides a system for coordinating data exchange among a plurality of devices. The system includes a processing system that includes one or more processors and one or more memories coupled with the one or more processors. The processing system may be configured to receive, from a service server, first verification data and a request. The first verification data is associated with performance of the service and the request includes a request for payment for performance of the service. The processing system may also be configured to determine, based on the first verification data, claim information for a payer associated with payment for performance of the service; send the claim information to a client server associated with the payer; receive, from the client server in response to the claim information, an acknowledgment of the claim information; and send, to the service server, the acknowledgment.

In a fourteenth aspect, in combination with the thirteenth aspect, the processing system is further configured to receive, from the client server, payment information, wherein the payment information indicates that payment has been processed for performance of the service; and send, to the service server, the payment information.

In a fifteenth aspect, in combination with one or more of the thirteenth aspect through the fourteenth aspect, the processing system is further configured to receive, from the client server, acknowledgment that performance of the service was completed, wherein the claim information is determined based on receiving the acknowledgment.

In a sixteenth aspect, in combination with one or more of the thirteenth aspect through the fifteenth aspect, determining the claim information includes determining a number of authorized units of the service have been performed based on the first verification data.

In a seventeenth aspect, in combination with one or more of the thirteenth aspect through the sixteenth aspect, the processing system is further configured to verify, based on the first verification data, that at least a portion of the service has been completed, and wherein the claim information is determined in response to determining that at least the portion of the service has been completed.

In an eighteenth aspect, in combination with one or more of the thirteenth aspect through the seventeenth aspect, a first formatting, a first encoding, or both of the first verification data is different from a second formatting, a second encoding, or both of the claim information. Determining the claim information includes converting at least a portion of the first verification into the second formatting, the second encoding, or a combination thereof.

In a nineteenth aspect, in combination with the eighteenth aspect, the processing system is further configured to determine the payer based on the first verification data; and select the second formatting, the second encoding, or both based on the payer.

A twentieth aspect provides a non-transitory computer-readable medium storing instructions that, when executed by a processor, cause the processor to receive, from a service server, first verification data and a request. The first verification data is associated with performance of the service and the request includes a request for payment for performance of the service. The processor may also be caused to determine, based on the first verification data, claim information for a payer associated with payment for performance of the service; send the claim information to a client server associated with the payer; receive, from the client server in response to the claim information, an acknowledgment of the claim information; and send, to the service server, the acknowledgment.

Some details associated with the implementations are described above, and others are described below. Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

A further understanding of the nature and advantages of the present disclosure may be realized by reference to the following drawings. The following drawings illustrate by way of example and not limitation. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like Reference numbers and designations in the various drawings indicate like elements.

DETAILED DESCRIPTION

Figure 1:
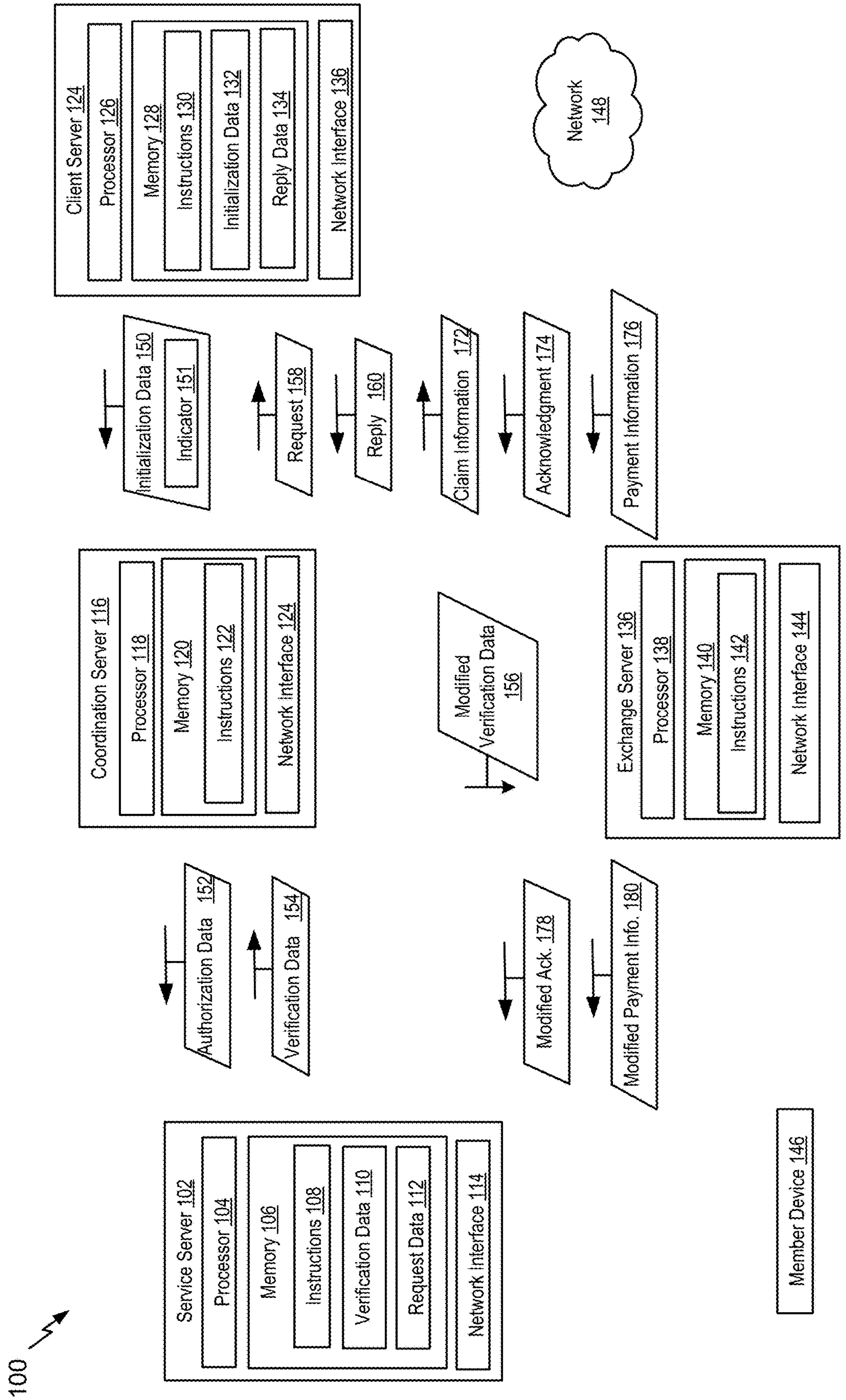
FIG. 1 is a block diagram of an example data processing system 100 that supports data coordination according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media that support data coordination to facilitate provision of services including those in which verification of service performance is advantageous. To effectuate the foregoing, a device, such as a coordination server, may receive a plurality of data types in different data formats, that employ different protocols, that are encoded in different ways, or a combination thereof. Accordingly, the coordination server may be configured to standardize the different data types, different data formats, different data encodings, or a combination thereof to facilitate data sharing and coordination. To illustrate, the coordination server may receive initialization data, associated with a service. The initialization data may include or indicate authorization data. The authorization data may include an identifier of an authorized service that has been authorized to be performed. Additionally, the coordination server may receive verification data, indicating that the authorized service has been performed. Further, the coordination server may process the verification data to generate modified verification data. For example, the coordination server may remove components of the verification data, mask PII included in the verification data, or a combination thereof, to generate the modified verification data. The coordination server may provide the modified verification data to an exchange server. Further, the coordination server may receive a request, such as a request for payment for the authorized services. Additionally, the coordination server may receive a reply, such as a confirmation of payment corresponding to the authorized service or a denial of payment corresponding to the authorized service.

While not limited to any particular context, an example of the foregoing is presented in the context of facilitating provision of home health services. The coordination server may receive the initialization data from a client server associated with a payer, such as a health insurance company. The initialization data may include an authorization, authorizing provision of home health services to an enrolled member of the health insurance company. The coordination server may receive verification data, such as visit verification (EVV) data, indicating that the authorized home health service was performed at a location of the enrolled member, such as at the enrolled member's home. The coordination server may process the EVV data to generate modified EVV data. For instance, the coordination server may modify the EVV data to indicate that the service was or was not performed, removing, from the EVV data, PII such as an identifier of the patient (e.g., a social security number), an identifier of the service provider, or the like. The coordination server may send the modified EVV data to an exchange server, associated with a clearinghouse (e.g., an insurance clearinghouse). The coordination server may receive a request, such as a payment request, from a service server associated with the service provider that performed the home health service. In response to the request, the coordination server may receive a reply from the client server. The reply may include payment information for performance of the authorized service or an indication of denial of payment for the authorized service, as examples.

Particular implementations of the subject matter described in this disclosure may be implemented to realize one or more of the following potential advantages or benefits. In some aspects, the present disclosure facilitates enhanced device interoperability, improved data processing efficiency, reduced overall energy consumption, and enhanced data security. By standardizing data encoding and formatting, interoperability among a plurality of devices that may execute different operating systems, may be enhanced. To illustrate, the coordination server may receive initialization data, verification data, a request, a reply, or an combination thereof, in different formats, encoded using different protocols, or both. For instance, the coordination server may receive a request from a service server that applies a first formatting or a first encoding to the request, and the coordination server may receive a reply from a client server that applies a second formatting or a second encoding to the reply. The first formatting or first encoding may be incompatible with the second formatting or the second encoding. The coordination server may be configured to standardize the first formatting, the first encoding, the second formatting, the second encoding, or a combination thereof. Accordingly, when the standardized request is provided to the client server or the standardized reply is provided to the service server, the client server may parse the standardized request and the service server may parse the standardized reply. In contrast, the client server may be unable to parse the non-standardized request and the service server may be unable to parse the non-standardized reply due, at least in part, to lack of compatibility in the formatting, encoding, or both of each. Thus, by standardizing the formatting, encoding, or both of data, the coordination server may be configured to enhance an interoperability among devices, thereby improving data coordination among them.

Additionally, the disclosure may enhance data processing efficiency. For example, rather than sending the initialization data, received from the client server, to the service server, the coordination server may obtain the authorization data based on the initialization data, thereby reducing a total quantity of data sent to the service server. As another example, by generating the modified verification data as a simplified version of the verification data, an overall reduced quantity of data may be sent to the exchange server and client server, respectively. In this way, by reducing an overall quantity of data being exchanged, the disclosure may enhance data processing efficiency.

Further, by enhancing data processing efficiency, a concomitant savings in energy usage may be realized. To elaborate, over millions or billions of provided services, by reducing a total amount of data being exchanged among devices while maintaining transactional integrity associated with the provided services, less energy may be consumed in data processing without negatively impinging upon results. While a total amount of energy saved per provided service may be small, over millions or billions of transactions, the energy savings may be significant.

Moreover, the disclosure may enhance an overall level of data security. For example, in generating modified verification data based on the verification data, PII associated with the verification data may be removed or obscured. To illustrate, rather than including, in the modified verification data, PII, such as unique identifiers associated with service providers, parties receiving services, and the like, such PII may be removed or obscured. In this manner, enhanced data security is provided.

FIG. 1 is a block diagram of example data processing system 100 that supports data coordination according to one or more aspects. Data processing system 100 includes a service server 102, a coordination server 116, a client server 124, an exchange server 136, a member device 146, and a network 148. Although one service server 102, one client server 124, and one member device 146 are depicted, in some other implementations, data processing system 100 may include multiple service servers, multiple client servers, multiple member devices, or combinations thereof. Additionally, or alternatively, although service server 102, coordination server 116, client server 124, and exchange server 136 are each described as servers, in other implementations, at least one of service server 102, coordination server 116, client server 124, and exchange server 136 may include or be a device other than a server, such as a computer or mobile device. In some implementations, each of service server 102, coordination server 116, client server 124, and exchange server 136 may be associated with or correspond to a different entity, such as a different individual, a different company, a different organization, etc.

Service server 102 may include a variety of components (such as structural, hardware components) used for carrying out one or more functions described herein. For example, these components may include one or more processors 104 (hereinafter referred to collectively as "processor 104"), one or more memory devices 106 (hereinafter referred to collectively as "memory 106"), and one or more network interfaces 114 (hereinafter referred to collectively as "network interface 114"). Processor 104 may be configured to execute instructions 108 stored in memory 106 to perform the operations described herein. Processor 104 may include or correspond to a CPU or microprocessor, a graphics processing unit ("GPU"), microcontroller, or a combination thereof that has been programmed to perform the functions of service server 102. Implementations described herein are not restricted by the architecture of processor 104 so long as processor 104, whether directly or indirectly, supports the operations described herein. Processor 104 may be one component or multiple components that may execute the various described logical instructions. The present disclosure is not restricted by the architecture of processor 104, as long as processor 104 supports modules, configurations, or operations as described herein. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality. In some implementations, a module is "[a] self-contained hardware or software component that interacts with a larger system." Alan Freedman, "The Computer Glossary" 268 (8th ed. 1998).

Memory 106 includes or is configured to store instructions 108, verification data 110, and request data 112. Verification data 110 may include or correspond to data indicating that a service was performed. For instance, verification data 110 may include geolocation data, a random value generated on a fob, biometric data such as verified voice data, or combinations thereof. As another example, verification data 110 may include or correspond to visit verification (EVV) data. Request data 112 may include data associated with a request generated by service server 102. For instance, request data 112 may include or correspond to an insurance claim, a request for payment, or a combination thereof.

Network interface 114 may be a network interface card (NIC), a transmitter, a receiver, a transceiver, or any combination thereof. Network interface 114 may be configured to communicate using a plurality of communication protocols, such as a Bluetooth™ protocol, a Zigbee™ protocol, a cellular communication protocol, such as any of the 3G, 4G, and/or 5G communication protocols, or any combination thereof. Additionally, network interface 114 may be any networking hardware capable of communicating using the 802.11 communication standard, the Ethernet communication standard, or other communication standards that may be developed Coordination server 116 may include a variety of components (such as structural, hardware components) used for carrying out one or more functions described herein. For example, these components may include one or more processors 118 (hereinafter referred to collectively as "processor 118"), one or more memory devices 120 (hereinafter referred to collectively as "memory 120"), and one or more network interfaces 124 (hereinafter referred to collectively as "network interface 124"). Processor 118, memory 120, and network interface 124 may be analogous to processor 104, memory 106, and network interface 114, respectively, of service server 102 and may thus include similar or corresponding features, components, structures, or combinations thereof as described in the context of service server 102. For example, processor 118 may be configured to execute instructions 122 stored in memory 120 to perform the operations described herein.

Client server 124 may include a variety of components (such as structural, hardware components) used for carrying out one or more functions described herein. For example, these components may include one or more processors 126 (hereinafter referred to collectively as "processor 126"), one or more memory devices 128 (hereinafter referred to collectively as "memory 128"), and one or more network interfaces 134 (hereinafter referred to collectively as "network interface 134"). Processor 126, memory 128, and network interface 136 may be analogous to processor 104, memory 106, and network interface 114, respectively, of service server 102 and may thus include similar or corresponding features, components, structures, or combinations thereof as described in the context of service server 102. For example, processor 126 may be configured to execute instructions 130 stored in memory 128 to perform the operations described herein.

Additionally, memory 128 is configured to store initialization data 132 and reply data 134. Initialization data 132 includes data to initialize a data coordination operation performed by coordination server 116. For example, initialization data 132 may include authorization data, census data, service data, or combinations thereof. Authorization data may include or correspond to an authorization, received from a device associated with a third party, to authorize performance of one or more services. For instance, authorization data may include or correspond to a clinician authorization to perform one or more medical services received from a clinician device. As another example, authorization data may include or correspond to authorization to perform a service, such a medical service, a repair service, or other service. In some implementations, the service may be authorized by an entity (e.g., an individual, a company, etc.) that is associated with or corresponds to client server 124. Census data may include unique identifiers indicating an identity of members associated with a client operating client server 124, indicating an identity of a service provider operating service server 102, or a combination thereof. Service data may indicate one or more authorized services to be performed, a quantity of the one or more authorized services, or a combination thereof. Reply data 134 may include transactional data associated with completion of the one or more authorized services, such as payment information.

Exchange server 136 may include a variety of components (such as structural, hardware components) used for carrying out one or more functions described herein. For example, these components may include one or more processors 138 (hereinafter referred to collectively as "processor 138"), one or more memory devices 140 (hereinafter referred to collectively as "memory 140"), and one or more network interfaces 144 (hereinafter referred to collectively as "network interface 144"). Processor 138, memory 140, and network interface 144 may be analogous to processor 104, memory 106, and network interface 114, respectively, of service server 102 and may thus include similar or corresponding features, components, structures, or combinations thereof as described in the context of service server 102. For example, processor 138 may be configured to execute instructions 142 stored in memory 140 to perform the operations described herein.

Member device 146 may include a variety of components (such as structural, hardware components) used for carrying out one or more functions described herein. These components may include one or more processors, one or more memories, one or more network interfaces, and one or more input/output (I/O) devices. The one or more I/O devices may be configured to receive input from and provide output to a member associated with member device 146. For instance the one or more I/O devices may include a display configured to render a graphical user interface (GUI) depicting, to a member, data obtained from service server 102 in response to a query made by member device 146 to service server 102. In some implementations, member device 146 may be associated with or correspond to an individual that receives performance of the service.

Network 148, such as a communication network, may facilitate communication of data among components of data processing system 100. For example, network 148 may also facilitate communication of data among service server 102, coordination server 116, client server 124, exchange server 136, member device 146 or any combination thereof. Network 148 may include a wired network, a wireless network, or a combination thereof. For example, network 148 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

During a typical cycle of operation of data processing system 100, coordination server 116 may receive initialization data 150 from client server 124. The initialization data 150 may include an indicator 151. Indicator 151 is associated with authorization data (e.g., 152). In some implementations, indicator 151 may include or indicate authorization data (e.g., 152). For example, initialization data 150 may indicate authorization data 152 by including and index value or a pointer to a memory location of memory 128 storing authorization data 152. Coordination server 116 may obtain authorization data 152 from or based on initialization data 150 and may send authorization data 152 to service server 102. By extracting authorization data 152 from initialization data 150 or otherwise obtaining authorization data 152 and sending authorization data 152 in lieu of initialization data 152, coordination server 116 may reduce a total quantity of data (e.g., a number of bytes of data) being sent to service server 102. In some implementations, authorization data 152 may indicate or identify authorized services to be performed, a quantity of such authorized services (e.g., a number of units) to be performed, or a combination thereof.

In response to transmission of authorization data 152 to service server 102, coordination server 116 may receive verification data 154 from coordination server 116. In some implementations, verification data 154 may include or indicate EVV data. Based on verification data 154, coordination server 116 may generate modified verification data 156. Modified verification data 156 may indicate whether or not an authorized service has been performed, a quantity of authorized services that have been performed, or both. For example, verification data 154 may include data verifying that an authorized service has been performed. Additionally, or alternatively, verification data 154 may include data indicating particulars regarding performance of the authorized service, such as a timeframe during which the authorized service was performed, identities of personnel performing the authorized service, biometric data associated with personnel performing the authorized service, geolocation data indicating a location at which an authorized service was performed, or combinations thereof.

In some implementations, modified verification data 156 may only indicate that the authorized service was performed or was not performed, a quantity of an authorized service that was performed assuming that the authorized service was performed, or a combination thereof. Additionally, or alternatively, modified verification data 156 may exclude all other data included in verification data 154 other than EVV data. Accordingly, by removing other components of verification data 154 to generate modified verification data 156, coordination server 116 may reduce a quantity of data (e.g., may reduce a number of bytes of data) being provided to service server 102. Additionally, by removing other components of verification data 154 to generate modified verification data 156, especially by removing or obscuring PII, coordination server 116 may enhance an overall level of data security.

Coordination server 116 may send modified verification data 156 to exchange server 136. Based on receipt of modified verification data 156, exchange server 136 may send request 158 to client server 124. Request 158 may include or correspond to a request for payment for rendered authorized services, completion of which is verified by modified verification data 156. In implementations, exchange server 136 may have received request 158 from coordination server 116 which itself may have received request 158 from service server 102. Service server 102 may generate request 158 based on request data 112 in response to receipt of verification data 110 from a service provider indicating that one or more authorized services associated with authorization data 152 have been completed.

In response to transmission of request 158 to client server 124, exchange server 136 may receive reply 160 from client server 124. Client server 124 may generate reply 160 based on reply data 134. Reply 160 may include transactional information associated with performed authorized services, such as payment information. For example, reply 160 may include data to facilitate withdrawal funds from one or more accounts associated with client operating client server 124, an indication of a quantity of payment to be tendered, an indication that payment will not be tendered, or a combination thereof. In implementations, exchange server 136 may send reply 160 to coordination server 116, and coordination server 116 may send reply 160 to service server 102.

Coordination server 116 may be configured to standardize a format, an encoding, or both of data received from other devices of data processing system 100. For example, in obtaining authorization data 152 from or based on initialization data 150 or otherwise obtaining authorization data 152 indicated by initialization data 150, coordination server 116 may be configured to standardize a formatting, an encoding, or both of authorization data 152. By standardizing a formatting, an encoding, or both of authorization data 152, authorization data 152 may be converted into platform agnostic data such that any device may decode, parse, or use authorization data 152. To illustrate, data processing system 100 may include a plurality of service servers, each potentially executing its own operating system. By standardizing a formatting, an encoding, or both of authorization data 152, authorization data 152 may be decoded by, parsed by, or used by any service server regardless of the operating system that the service server executes. In like fashion, coordination server 116 may standardize a formatting, an encoding, or both of modified verification data 156, request data, reply data, or combinations thereof. For instance, just as data processing system 100 may include a plurality of service servers, data processing system 100 also may include a plurality of client servers, such as client server 124, each potentially executing a different operating system. By standardizing the formatting, encoding, or both of data received by coordination server 116, coordination server 116 configures the data so that the data may be decoded by, parsed by, or used by a wide variety of devices, such as a wide variety of client servers, service servers, or both that may be components of data processing system 100.

Moreover, coordination server 116, exchange server 136, or both may be configured to perform a data verification and management operation. In performing the data verification and management operation, coordination server 116, exchange server 136, or both may be configured to identify missing data, such as components of initialization data 150, verification data 154, request 158, reply 160, or any combination thereof, the lack of which may impede or prevent resolution of request 158, reply 160 or both. For example, coordination server 116 may be configured to identify that a specified quantity of authorized services (e.g., a maximum number of units of authorized services) is missing from the authorization data included in initialization data 150. In response to identifying a lack of one or more items of data, coordination server 116 may be configured to message the appropriate device (e.g., service server 102, client server 125, exchange server 136) to request the missing one or more items of data.

Further, in performing the data verification and management operation, coordination server 116, exchange server 136, or both may be configured to manage data. For example, in a context in which the authorization data included in initialization data 150 authorizes performance of a maximum quantity of authorized services (e.g., a maximum number of units of authorized services), coordination server 116 may be configured to account for the quantity of performed authorized services.

To illustrate, in a health care context, authorization data included in initialization data 150 may authorize performance of a first quantity, such as x units (e.g., x hours), of an authorized service (e.g., physical therapy services). Verification data 154 may indicate that a second quantity, such as y units (e.g., y hours), of authorized services were performed. Coordination server 116 may be configured to compare the first quantity, such as the y units of performed services, against the second quantity, such as the x units of authorized services. In response to identifying that the first quantity (e.g., the y units) exceeds the second quantity (e.g., the x units), coordination server 116 may be configured to generate a reply, such as reply 160, denying a request, such as request 158, for payment of the y units of services. In response to identifying that the first quantity (e.g., the quantity of y units) is less than the second quantity (e.g., the quantity of x approved units), coordination server 116 may be configured to decrement the second quantity (e.g., the x units) by the first quantity (e.g., the y units). Additionally, coordination server 116 may further be configured to iteratively compare any further units of services performed as might be indicated in any additional verification data 154 received to ensure that the total number of performed units of authorized services do not exceed the approved quantity of authorized services indicated in the authorization data.

While coordination server 116 may deny a request (e.g., request 158) in the event that the quantity of units of performed services exceeds the quantity of units of authorized services, in some implementation, coordination server 116 may initiate other actions. For instance, coordination server 116 may message client device 124 to seek an authorization for payment of the excess. Additionally, while the data management functionality is described with reference to coordination server 116, the described data management functionality may be performed by exchange server 136.

While data processing system 100 is not limited to any particular operational environment, an example involving insurance transactions may be provided. In an example, client server 124 may be operated by an insurance company or health services payor, such as a governmental entity (e.g., a governmental entity administering Medicare or foreign analog thereof). Service server 102 may be operated by a service provider, authorized by the insurance company or health services payor, to provide one or more servers to members of the insurance company or recipients of benefits from the health services payor. Member device 146 may be operated by a member of the insurance company or recipient of benefits from the health services payor, who pays premiums to the insurance company to protect member against certain risks as specified in a contract between the member and the insurance company or who otherwise is entitled to receive benefits from the health services payor. For example, the member may be diagnosed with a health condition necessitating that a medical service is provided at the member's home. Accordingly, a clinician, operating a clinician device (not illustrated) may send an authorization to client server 124, authorizing the medical service.

Client server 124 may be configured to generate initialization data 132 by bundling the authorization with other data. For example, this other data may include a member identifier corresponding to the member and uniquely identifying the member for whom the medical service is to be provided, a service provider identifier uniquely identifying a service provider authorized to perform the medical service, service data indicating particulars about the medical service to be performed (e.g., a unique identifier corresponding to the service), such as a quantity of services to be provided, and other data, collectively constituting initialization data 132. Client server 124 may send initialization data 132, which may correspond to initialization data 150, to coordination server 116. Coordination server 116 may extract authorization data 152 from or derive authorization data 152 based on initialization data 150 and may send authorization data 152 to service server 102. Alternatively, initialization data 150 may include a pointer to a memory location of memory 128 storing authorization data 152, and coordination server 116 may obtain authorization data 152 from the memory location.

Service server 102 may send authorization data 152 to one or more devices (e.g., a laptop, a smartphone, etc.) associated with a service provider. Based on receipt of authorization data 152 at the device associated with the service provider, the service provider may perform the medical service at the member's home. For example, a medical service may include physical therapy to be performed at the member's home.

In response to completion of the service, the service provider may generate verification data 110, which the service provider may send, using the device associated with the service provider, to service server 102. Verification data 110 may include a voice message indicating that the service has been performed, geolocation data indicating a location of the device associated with the service provider, a timeframe indicating a date and time at which performance of the service was commenced and a date and time at which performance of the service was completed, details regarding performance of the service, or combinations thereof. For example, verification data 110 may include a unique code provided to the device associated with the service provider in response to the service provider affirming that the services have been completed. As another example, verification data 110 may include or correspond to EVV. Service server 102 may store verification data 110 in memory 106 and may be configured to authenticate components of verification data 110. For instance, if verification data 110 includes a voicemail from the service provider to indicate that the service has been completed and geolocation data, service server 102 may be configured to compare the voice data included in the voicemail against exemplars of the service provider's voice stored in memory 106 to verify an identity of the service provider. Additionally, service server 102 may compare geolocation data included in verification data 110 against location data of a member's home (e.g., an address) to verify that the device associated with the service provider was at the member's home.

Service server 102 may send verification data 154, which may correspond to verification data 110, to coordination server 116. Additionally, in response to receipt of verification data 110 from a device associated with the service provider, service server 102 may be configured to generate request data 112 and store request data 112 in memory 106. Request data 112 may include or correspond to a request for payment for the services, such as an insurance claim (e.g., an "837" in health insurance terminology). In implementations, service server 102 may send verification data 154, the request, or both to coordination server 116.

Coordination server 116 may be configured to generate modified verification data 156 based on verification data 154. Modified verification data 156 may include only an indication that the service was performed or was not performed. For instance, modified verification data 156 may be a single bit in which a "1" indicates that the service was performed and a "0" indicates that the service was not performed or vice versa. In implementations, coordination server 116 may analyze verification data 154 to determine whether the service corresponding to verification data 154 was, in fact, performed. Coordination server 116 may send modified verification data 156 to exchange server 136. Additionally, coordination server 116 may send the request to exchange server 136. In implementations, coordination server 116 may standardize the request to standardize a formatting, an encoding, or both of the request. For instance, coordination server 116 may format the request so that the request has a formatting that is standard in the insurance industry, converting the request into an "837" insurance claim, as may be typically used in the health insurance industry.

In response to modified verification data 156 indicating that the service was performed, exchange server 136 may send request 158 to client server 124. In some implementations, exchange server 136 also may send modified verification data 156 to client server 124.

In response to receipt of request 158, client server 124 may generate reply 160. Reply 160 may include payment data. In implementations, exchange server 136 may send reply 160 to coordination server 116, and coordination server 116 may send reply 160 to service server 102. In such implementations, coordination server 116 also may standardize reply 160 to standardize a formatting, an encoding, or both of reply 160. For instance, coordination server 116 may standardize reply 160 in accordance with a format typically used by the health insurance industry. In particular, coordination server 116 may convert reply 160 into an "835" (e.g., a format typically used in the health insurance industry) to indicate payment for the service. In this manner, payment for authorized services may be effectuated in response to objective verification that the authorized services were, in fact, performed.

In certain implementations, the system 100 may be further configured to facilitate payment processing and claim processing between service providers and clients or payers. For example, the coordination server 116 may be configured to receive, from a service server 102, first verification data 154 and a request 158. The first verification data 154 may be associated with performance of the service and the request 158 may include a request for payment for performance of the service. In certain implementations, the coordination server 116 may be configured to receive, from a member device, an acknowledgment that performance of the service was completed. In such instances, the claim information 172 may be determine based on receiving the acknowledgment 174.

In certain implementations, the service may be a home health care service with electronic visit verification (EVV). For instance, the home heal services may include dialysis, daily living assistance, meal preparation, and the like, and may be provided at a patient's home.

The coordination server 116 may be configured to determine, based on the first verification data 154, claim information 172 for a payer associated with payment for performance of the service. In certain implementations, the payer may refer to a client or other entity responsible for paying the service provider for the performed services, such as an insurance company, a government healthcare program (e.g., Medicare or Medicaid), or a private organization. For example, in the case of EVV services, the payer could be a state Medicaid program that reimburses home health agencies for services validated through EVV.

In certain implementations, the first verification data 154 may include an authorization identifier for the service. In such instances, the claim information 172 may include the authorization identifier for the service. In still further implementations, the claim information 172 may include information comprising a service identifier for the service, one or more dates of performance of the service, one or more durations of performance of the service, one or more billing units for the service, a payer format associated with the payer, an identifier of a provider of the service, an identifier of a client of the service, or a combination thereof.

In certain implementations, the coordination server may be configured to verify, based on the first verification data 154, that at least a portion of the service has been completed. In such instances, the claim information 172 may be determined in response to determining that at least the portion of the service has been completed, which may be performed as discussed above.

In certain implementations, determining the claim information 172 includes determining a number of authorized units of the service have been performed based on the first verification data 154. As previously discussed, the number of authorized units can be determined by comparing the performed services against the authorized services, ensuring that the total performed units do not exceed the authorized units. This may include decrementing the allowed units as services are verified and provided. For example, if the authorization is for 10 hours of physical therapy, and 2 hours have been performed and verified, the coordination server 116 will update the remaining authorized units to 8 hours.

In certain implementations, a first formatting, a first encoding, or both of the first verification data 154 may be different from a second formatting, a second encoding, or both of the claim information 172. In such instances, determining the claim information 172 comprises converting at least a portion of the first verification into the second formatting, the second encoding, or a combination thereof. In certain implementations, the formatting and encodings may include using various standards, including proprietary and open standards. For example, a proprietary format might be tailored for a specific insurance company's internal processing system, while an open standard format like EDI 837 may be standardized for use with multiple systems. Example encodings may include converting a JSON encoded data package into an XML format for compatibility with different client server systems, or adjusting date and time formats to meet specific regional requirements dictated by different payers.

In certain implementations, multiple payers may be supported, with different data or data formatting requirements for each payer. For example, one payer may require data in the EDI 837 format, while another may use a JSON-based format with specific field names and structures. Another example includes differing requirements for time stamps, where one payer might require UTC time while another might require local time zones to be specified. The coordination server 116 may be configured to dynamically adjust the data formats to meet these requirements. In particular, the coordination server 116 may be configured to determine the payer based on the first verification data 154 and select the second formatting, the second encoding, or both based on the payer. In certain implementations, the payer may be determined as a payer ID, which may be included in the verification data 154, or it may be determined based on previously-stored client information associated with the recipient of the service. For instance, the coordination server 116 may reference a database of client information to identify the appropriate payer for an identified service. In certain implementations, the coordination server 116 may store different formatting information associated with identifiers for one or more payers, allowing it to select the appropriate formatting based on the identifier of the determined payer. For example, if the payer is identified as a state Medicaid program, the coordination server 116 may select the EDI 837 format for claim submission. As another example, if the payer is a private insurance company using a proprietary JSON-based format, the coordination server 116 will convert the verification data into the required JSON structure to ensure compatibility.

The coordination server 116 may be configured to send the claim information 172 to a client server 124 associated with the payer. The coordination server 116 may also receive, from the client server 124 in response to the claim information 172, an acknowledgment 174 of the claim information 172. In certain implementations, the acknowledgment 174 may include all or part of the claim information 172, a timestamp indicating when the claim information was received, a status of the claim (e.g., accepted, pending, or rejected), error codes or other indications if the claim was not accepted, or a combination thereof. Additionally, the acknowledgment 174 may include payer-specific processing information, such as an estimated time for claim adjudication or additional steps required for further processing.

The coordination server 116 may be configured to send, to the service server 102, the acknowledgment 174. In certain implementations, the acknowledgment 174 may be sent to the service server 102 as received. In additional or alternative implementations, the acknowledgment 174 may be modified before being sent to the service server 102. For instance, the acknowledgment 174 may be in the second formatting, the second encoding, or both. In such instances, sending the acknowledgment 174 to the service server 102 may include determining a modified acknowledgment 178 in the first formatting, the first formatting, or both, and sending the modified acknowledgment 178 to the service server 102. In certain implementations, the coordination server 116 may determine a modified acknowledgment 178 based on the initial acknowledgment 174 to comply with the requirements of the determined second format. For example, the coordination server 116 may remove unnecessary metadata from the acknowledgment 174 to create a streamlined version, or may translate error codes into a standardized format associated with the service server 102.

The coordination server 116 may be further configured to receive, from the client server 124, payment information 176. The payment information 176 may indicate that payment has been processed for performance of the service. In certain implementations, the payment information 176 may include remittance information for the claim. Remittance information may include detailed information on the payment, including the amount paid, the services covered, and any adjustments or deductions made. Examples of other types of payment information 176 may include payment transaction identifiers, payment dates, amounts paid, payer account details, provider account details where the payment was deposited, explanatory notes regarding the payment processing, or a combination thereof.

In certain implementations, the coordination server 116 may be configured to send, to the service server 102, the payment information 176. In certain implementations, the format of the payment information 176 may be similarly converted before sending it to the service server 102, such as using techniques similar to those explained above. For instance, if the initial payment information 176 is in a second formatting and a second encoding required by the payer, and the service server 102 requires a first formatting and a first encoding, the coordination server 116 may be configured to convert the payment information 176 into the second formatting and second encoding. This conversion ensures compatibility and results in a modified payment information 180 that the service server 102 can accurately process.

In certain implementations, determining the claim information 172 and sending the claim information 172 to the client server 124 may be performed in real time after receiving the first verification data 154. In certain implementations, real-time processing may include handling and processing data almost instantaneously, such as within a few milliseconds to a few seconds from the time data is received. For example, upon receiving the first verification data 154, the coordination server 116 may immediately process and submit the claim information 172 to the client server 124 for approval in real time. Once the client server 124 sends back acknowledgment 174, the coordination server 116 may update the service server 102 in real time.

In certain implementations, the system 100 may be configured to enable the bulk submission and processing of verification data and payment requests from providers. Bulk processing may include handling and processing large volumes of data in a single operation, rather than individually. For example, bulk processing may enable providers to submits multiple claims and requests for payment at a time. In certain implementations, the first verification data 154 may include verification for a plurality of services. In such instances, determining the claim information 172 may include determining separate claim information 172 for each of the plurality of services. For example, separate claim information 172 may be determined and generated for each performance of each service when detailed individual submissions are required. Alternatively, the coordination server 116 may compile multiple performances of services into a single claim information 172 where appropriate, such as when services are provided by the same provider to the same client over a specific billing period. For example, the coordination server 116 can process and submit claims for 50 different home health service visits in a single batch operation, reducing the need for individual submissions. As another example, multiple weekly nursing visits to the same patient can be aggregated into a single claim, streamlining the billing process for that period.

In certain implementations, communication may occur directly between the coordination server 116 and the other servers 102, 124, 136. This may include direct communication without further converting, adjusting, or verification steps being required. For example, if both the coordination server 116 and the client server 124 use compatible data formats and protocols, the coordination server 116 can directly transmit the claim information 172 and receive acknowledgment 174 without additional processing steps. This direct communication can enhance efficiency and reduce latency in the data exchange process.

Data coordination operations performed in accordance with the disclosure hereof provide various advantages, such as enhanced device interoperability, improved data processing efficiency, reduced overall energy consumption, and enhanced data security. To elaborate, coordination server 116, exchange server 136, or both may enhance device interoperability by standardizing data received from other devices. For example, by standardizing a formatting, an encoding, or both of authorization data 152, verification data 154, request data associated with request 158, reply data associated with reply 160, or any combination thereof, coordination server 116, exchange server 136, or both configured the data so that the data may be decoded by, parsed by, or used by a wide variety of devices, such as a wide variety of client servers or service servers that may be components of data processing system 100. Accordingly, by serving as a nexus of data received from a plurality of devices associated with data processing system 100 and by standardizing the received data, coordination server 116 and exchange server 136 are configured to enhance device interoperability and improve data coordination among the plurality of devices.

Additionally, coordination server 116, exchange server 136, or both may be configured to improved data processing efficiency by reducing a quantity of data exchanged among devices of data processing system 100. For instance, by removing authorization data 152 from initialization data 150 and providing authorization data 152 to service server 102 rather than providing initialization data 150 to service server 102, a quantity of data being exchanged is reduced. As another example, by generating modified verification data 156 from verification data and providing modified verification data 156 rather than verification data 154 to exchange server 136, a total quantity data being exchanged is reduced without sacrificing service performance. In this manner, improved data processing efficiency is provided.

Further, by enhancing data processing efficiency, a concomitant savings in energy usage may be realized. To elaborate, over millions or billions of provided services, by reducing a total amount of data being exchanged among devices of data processing system 100 while maintaining transactional integrity associated with the provided services, less energy may be consumed in data processing without negatively impinging upon the provided services. While a total amount of energy saved per provided service may be small, over millions or billions of transactions, the energy savings may be significant.

Moreover, an overall level of data security may be enhanced. To illustrate, coordination server 116 may generate modified verification data 156 based on verification data 154 by removing or obscuring PII included in verification data 154. By removing or obscuring PII prior to sending modified verification data 156 to exchange server 136, an overall level of data security is improved, since PII-bearing data is not exchanged. In this manner, fewer opportunities are presented to malevolent actors, such as hackers, to hack into or otherwise nefariously obtain PII included in verification data 154.

Data coordination operations performed in accordance with the disclosure hereof provide various advantages, such as enhanced device interoperability, improved data processing efficiency, reduced overall energy consumption, and enhanced data security. To elaborate, coordination server 116, exchange server 136, or both may enhance device interoperability by standardizing data received from other devices. For example, by standardizing a formatting, an encoding, or both of authorization data 152, verification data 154, request data associated with request 158, reply data associated with reply 160, or any combination thereof, coordination server 116, exchange server 136, or both configured the data so that the data may be decoded by, parsed by, or used by a wide variety of devices, such as a wide variety of client servers or service servers that may be components of data processing system 100. Accordingly, by serving as a nexus of data received from a plurality of devices associated with data processing system 100 and by standardizing the received data, coordination server 116 and exchange server 136 are configured to enhance device interoperability and improve data coordination among the plurality of devices.

Additionally, coordination server 116, exchange server 136, or both may be configured to improved data processing efficiency by reducing a quantity of data exchanged among devices of data processing system 100. For instance, by removing authorization data 152 from initialization data 150 and providing authorization data 152 to service server 102 rather than providing initialization data 150 to service server 102, a quantity of data being exchanged is reduced. As another example, by generating modified verification data 156 from verification data and providing modified verification data 156 rather than verification data 154 to exchange server 136, a total quantity data being exchanged is reduced without sacrificing service performance. In this manner, improved data processing efficiency is provided.

Further, by enhancing data processing efficiency, a concomitant savings in energy usage may be realized. To elaborate, over millions or billions of provided services, by reducing a total amount of data being exchanged among devices of data processing system 100 while maintaining transactional integrity associated with the provided services, less energy may be consumed in data processing without negatively impinging upon the provided services. While a total amount of energy saved per provided service may be small, over millions or billions of transactions, the energy savings may be significant.

Moreover, an overall level of data security may be enhanced. To illustrate, coordination server 116 may generate modified verification data 156 based on verification data 154 by removing or obscuring PII included in verification data 154. By removing or obscuring PII prior to sending modified verification data 156 to exchange server 136, an overall level of data security is improved, since PII-bearing data is not exchanged. In this manner, fewer opportunities are presented to malevolent actors, such as hackers, to hack into or otherwise nefariously obtain PII included in verification data 154.

Figure 2:
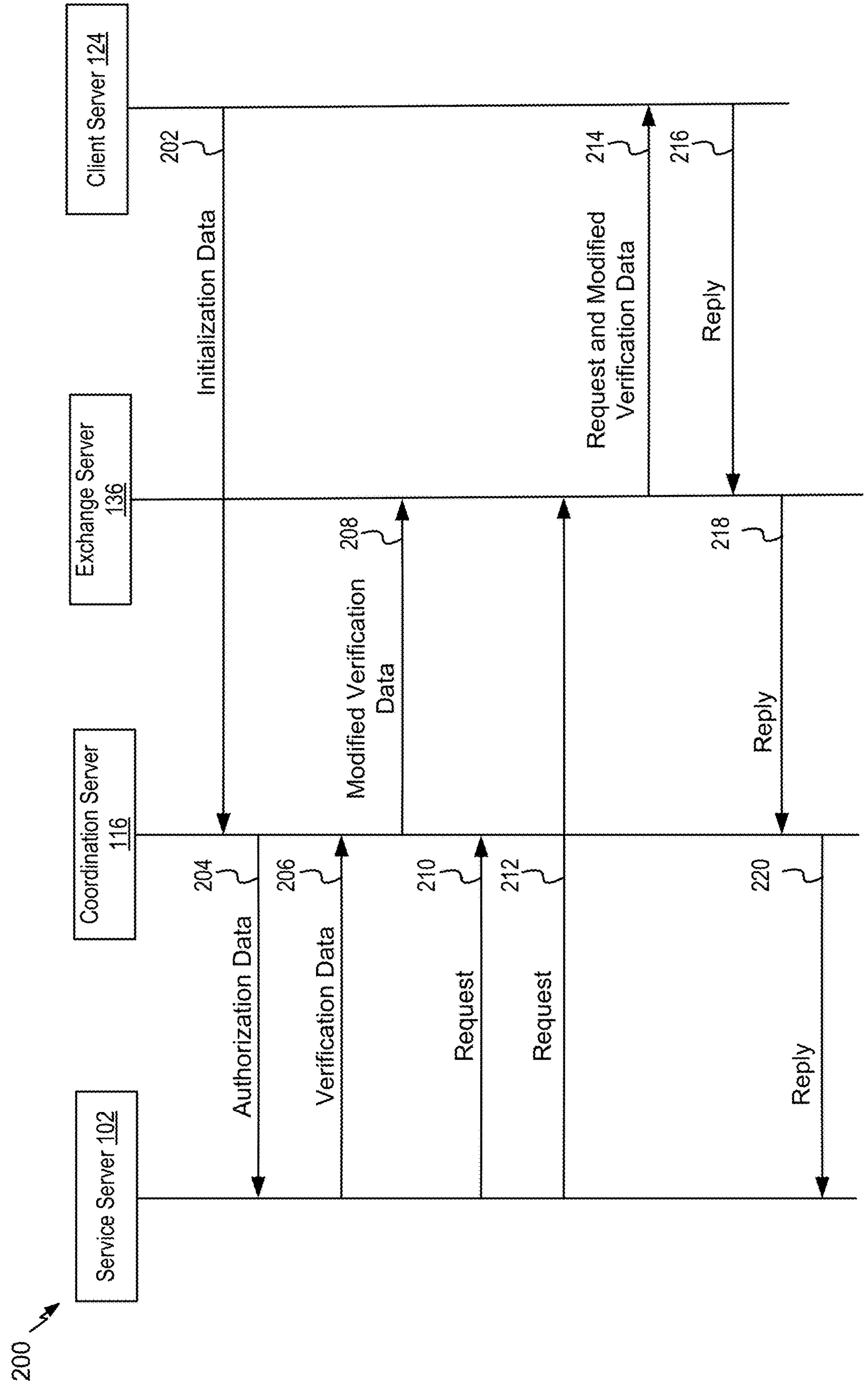
FIG. 2 is a ladder diagram of example process that supports data coordination according to one or more aspects.

FIG. 2 is a ladder diagram of example process 200 that supports data coordination according to one or more aspects. FIG. 2 illustrates data exchanges among service server 102, coordination server 116, exchange server 136, and client server 124. At 202, client server 124 sends initialization data to coordination server 116. The initialization data may include or correspond to initialization data 132, 150. At 204, coordination server 116 may extract authorization data from the initialization data and may send the authorization data to service server 102. The authorization data may include or correspond to authorization data 152. In extracting the authorization data from the initialization data, coordination server 116 may standardize the authorization data by standardizing a format, an encoding, or both of the authorization data. Additionally, it is noted that, by extracting the authorization data from the initialization data, coordination server 116 may reduce a total quantity of data (e.g., a total number of bytes) of data being sent to service server 102.

At 206, in response to receipt of the authorization data, service server 102 generates verification data, which may correspond to verification data 110. Alternatively or additionally, service server 102 may receive the verification data from one or more devices associated service providers, and service server 102 may store the verification data in a memory. Additionally, service server 102 may process the verification data prior to sending the verification data. Moreover, service server 102 may send the verification data to coordination server 116. The verification data sent to coordination server 116 may include or correspond to verification data 154.

At 208, coordination server 116 may generate modified verification data based on the verification data. The modified verification data may include or correspond to modified verification data 156. The modified verification data may include an indicator that the service associated with the authorization data has or has not been performed. Additionally, the modified verification data may include an additional indicator indicating a quantity of services that have been performed assuming that the services were performed (e.g., a quantity of physical therapy sessions performed). Accordingly, by extracting other aspects of the verification data to generate the modified verification data, a volume of data that is eventually sent may be reduced. Additionally, to generate the modified verification data in some implementations, coordination server 116 may standardize the verification data to standardize a format, an encoding, or both of the modified verification data so that the modified verification data becomes platform agnostic and can be parsed by any device regardless of an operating system that operates the device. Additionally, at 208, coordination server 116 sends the modified verification data to exchange server 136.

At 210, service server 102 may generate and send a request, such as request 158, to coordination server 116. The request may include or correspond to a request for payment for the services. For example, in an insurance context, the request may include or correspond to an insurance claim. In implementations, coordination server 116 may standardize the request. For instance, coordination server 116 may standardize an encoding, a formatting, or both of the request. In particular and in a health insurance context, coordination server 116 may convert the request to the health insurance-industry standard "837" insurance claim.

At 212, service server 120 also may send the request, such as request 158, to exchange server 136. In implementations, exchange server 136 may standardize the request. For instance, coordination server 116 may standardize an encoding, a formatting, or both of the request. In particular and in an insurance context, coordination server 116 may convert the request to the health insurance-industry standard 837 insurance claim.

At 214, exchange server 136 may send the request and the modified verification data to client server 124. The modified verification data may indicate, to client server 124, whether a service associated with the authorization data (e.g., the authorized service) was or was not performed. Since the modified verification data only indicates whether the service was or was not performed, fewer computational resources may be expended by client server 124 to process the modified verification data than would be expended to process the verification data. Additionally, since, in some implementations, the request and the modified verification data have been standardized, client server 124 may be configured to parse each of the request, the modified verification data, or both regardless of an operation system executed by client server 124. In a typical information processing system 100, a plurality of client servers may be present, each of which may implement a different operating system (e.g., Windows, IOS, Android, Linux, etc.). By standardizing the request and the modified verification data, any client server may parse or use the modified verification data, the request, or both.

At 216, client server 124 may generate a reply and may send the reply to exchange server 136. For instance, client server 124 may generate the reply based on the request, the modified verification data, or both. The reply may indicate whether or to what extent payment is to be tendered for the authorized services and may include payment data. For example, in response to modified verification data indicating that the service was incomplete, the reply may include or correspond to an indication that payment for the authorized services is to be denied. Conversely, in response to modified verification data indicating that the service was completed, the reply may include or correspond to payment data for the completed authorized services. Additionally, in some cases, the authorized services may include a quantity of services to be performed, such as a maximum quantity of physical therapy sessions. In such cases, the modified verification data may indicate the quantity of services that had been completed (e.g., 8 out of 10 physical therapy sessions completed), and the reply may include payment for the percentage of the services indicated to have been completed (e.g., 80% payment for 8 out of 10 physical therapy sessions completed). Conversely, in some implements, in response to identifying that all of the services have not been completed based on parsing the modified verification data (e.g., 8 out of 10 physical therapy sessions completed), client server 124 may generate a reply indicating that payment is denied.

At 218, exchange server 136 receives the reply from exchange server 136 and may send the reply to coordination server 116. In implementations, the exchange server 136 may standardize the reply by standardizing a formatting, an encoding, or both of the reply. In other implementations, exchanger server 136 may send the unstandardized reply to the coordination server 116.

At 220, coordination server 116 may receive the reply from exchange server 136 and may send the reply to service server 102. In some implementations, such as implementations in which exchange server 136 sends the reply without standardizing the reply, coordination server 116 may standardize the reply by standardizing a formatting, an encoding, or both of the reply. In other implementations, exchange server 136 may send the standardized reply (e.g., standardized by exchange server 136) to service server 102. In other implementations, coordination server 116 may send an unstandardized reply to service server 102. In implementations in which the reply includes payment data, service server 102 may effectuate payment based on the payment data included in the reply, such as by drawing on an account associated with the client and indicated in the reply.

Figure 3:
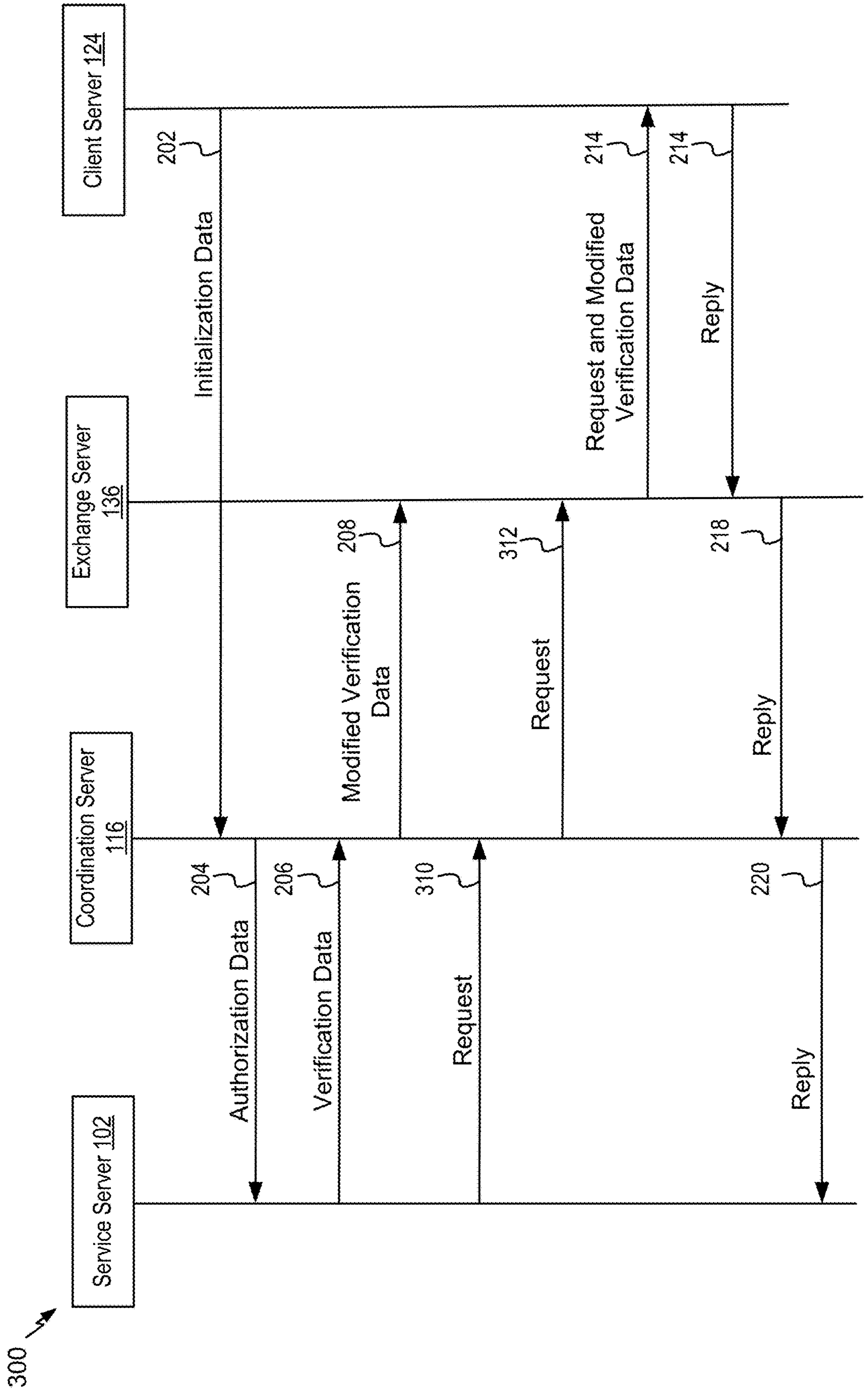
FIG. 3 is a ladder diagram of example process that supports data coordination according to one or more aspects.

FIG. 3 is a ladder diagram of example process 300 that supports data homogenization and simplification according to one or more aspects. As compared to FIG. 2, FIG. 3 includes different operations described at 310 and 312. At 310, service server 102 sends a request, such as request 158, to coordination server 116. In implementations, coordination server 116 may standardize the request by standardizing a formatting, an encoding, or both of the request. At 312, coordination server 116 may send the standardized request to exchange server 136. Alternatively, coordination server 116 may send the standardized request to exchange server 136, and exchange server 136 may standardize the request prior to sending the request to client server 124.

Figure 4:
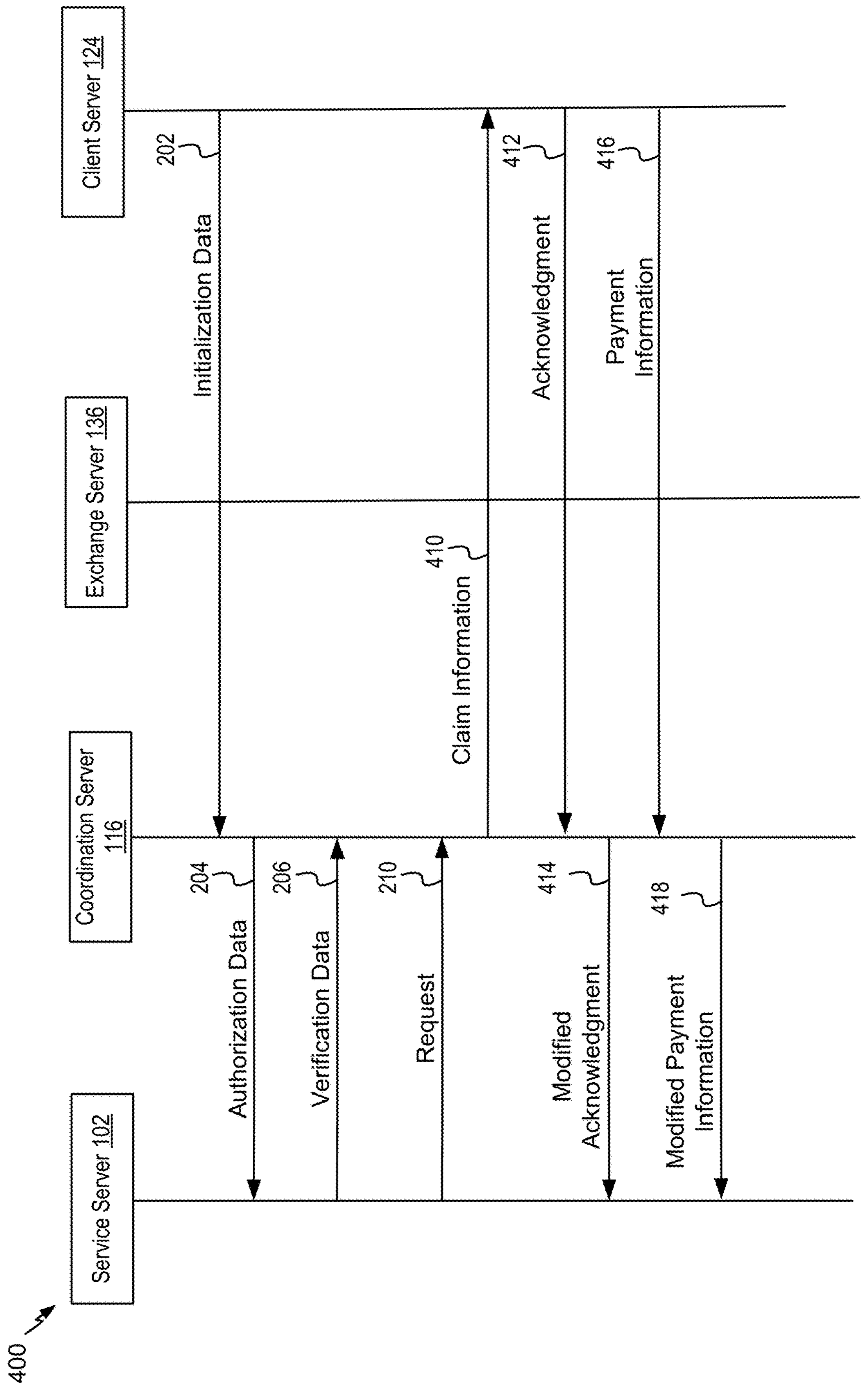
FIG. 4 is a ladder diagram of example process that supports data coordination according to one or more aspects.

FIG. 4 is a ladder diagram of example process 400 that supports data coordination according to one or more aspects. FIG. 4 illustrates data exchanges among service server 102, coordination server 116, exchange server 136, and client server 124, such as to coordinate payment for performance of services. The process 400 may be performed in connection with one or more other processes discussed herein, such as the processes 200, 300. For example, the process 400 includes 202, 204, and 206 from processes 200, 300 and may be performed in combination with one or more additional steps from the processes 200, 300.

At 202, client server 124 sends initialization data to coordination server 116. At 204, the coordination server 116 sends authorization data 152 to service server 102. At 206, the service server 102 sends verification data 154 to the coordination server 116. At 210, the service server 102 sends a request, such as request 158, to coordination server 116. At 410, the coordination server sends claim information 172 to the client server 124. At 412, the client server 124 sends an acknowledgment 174 of the claim information 172 to the coordination server 116. At 414, the coordination server 116 sends a modified acknowledgment 178 to the service server 102. At 416, client server 124 sends payment information 176 to the coordination server 116. At 418, the coordination server 116 sends modified payment information 180 to the service server 102.

Figure 5:
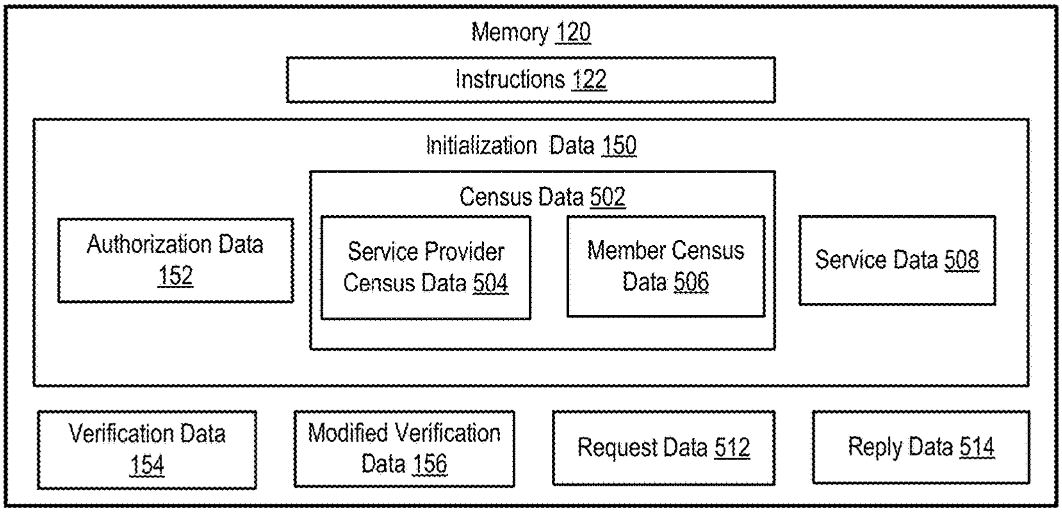
FIG. 5 is a block diagram depicting data types stored in a memory of a coordination server and that support data coordination according to one or more aspects.

FIG. 5 is a block diagram depicting data types stored in a memory of a coordination server and that support data coordination according to one or more aspects. In particular, FIG. 5 depicts data types stored in the memory of the coordination server after the coordination server executes a typical cycle of operation as described with reference to FIG. 1. As shown in FIG. 5, memory 120 stores, in addition to instructions 122, initialization data 150 received from a client server, such as client server 124, and verification data 154, received from a service server, such as service server 102. Additionally, memory 120 stores modified verification data 156 and request data 512, corresponding to a request, such as request 158, received from the service server. Further, memory 120 stores reply data 514, corresponding to reply 160, received at the coordination server from the client server, via an exchange server, such as exchange server 136.

Initialization data 150 may include authorization data 162, census data 502, and service data 508. Census data 502 may include service provider census data 504 and member census data 506. Service provider census data 504 may include or correspond to one or more unique identifiers associated with one or more service providers authorized, by a client controlling the client server, to provide services on behalf of the client for one or more of the client's members. For example, in the context of medical services, service provider census data 504 may include or correspond to identifiers associated with one or more medical service providers authorized, by an insurance company, to provide medical services. Member census data 506 may include or correspond to one or more unique identifiers associated with one or more members, such as enrolled members of an insurance company. For instance, in the context of medical services, member census data 506 may include or correspond to customers of a health insurance company (e.g., insured patients).

As depicted in FIG. 5, the coordination server may serve as a data nexus for a data processing system, such as for data processing system 100, thereby facilitating data coordination among a plurality of devices associated with data processing system 100. To illustrate, the coordination server, such as coordination server 116, may store, in its memory, such as memory 120, each item of a plurality of data items associated with effectuating one or more transactions. For example, in an insurance context, memory 120 of the coordination server may store data to effectuate one or more insurance service transactions, such as the processing of one or more insurance claims. To elaborate and in this context, authorization data 152 may include or correspond to authorization to perform a service. For instance, in the context of property insurance, the authorization may include or correspond to an authorization from an adjuster to authorize one or more remediations to a property covered by a property insurance policy. Service provider census data 504 may include or correspond to identifiers uniquely identifying one or more contractors authorized, by an insurance company, to perform the one or more repairs corresponding to authorization data 152. Member census data 506 may include or correspond to one or more unique identifiers associated with homeowners insured by an insurance company that controls or manages the client server, such as client server 124. Service data 508 may include data about the authorized services, such as a quantity of authorized services, a total amount of money authorized for performance of the authorized services, or combinations thereof.

Verification data 154 may include or correspond to geolocation data indicating that a service provider, authorized to perform the one or more authorized services is or was at a property of the enrolled member homeowner. Additionally, verification data 154 may include biometric data (e.g., a fingerprint, an iris scan, etc.) indicating an identity of the contractor who performed the authorized service at the insured property. Modified verification data 156 may indicate that the authorized service was or was not completed. For instance, modified verification data 156 may indicate that a repair service was completed. Request data 512 may include or correspond to a request for payment by the contractor that performed the remediation service at the homeowner's property. Reply data 514 may include or correspond to payment data so that the contractor that performed the remediation service may draw money from an insurance company's account. Alternatively, reply data 514 may include or correspond to a denial of payment.

Figure 6:
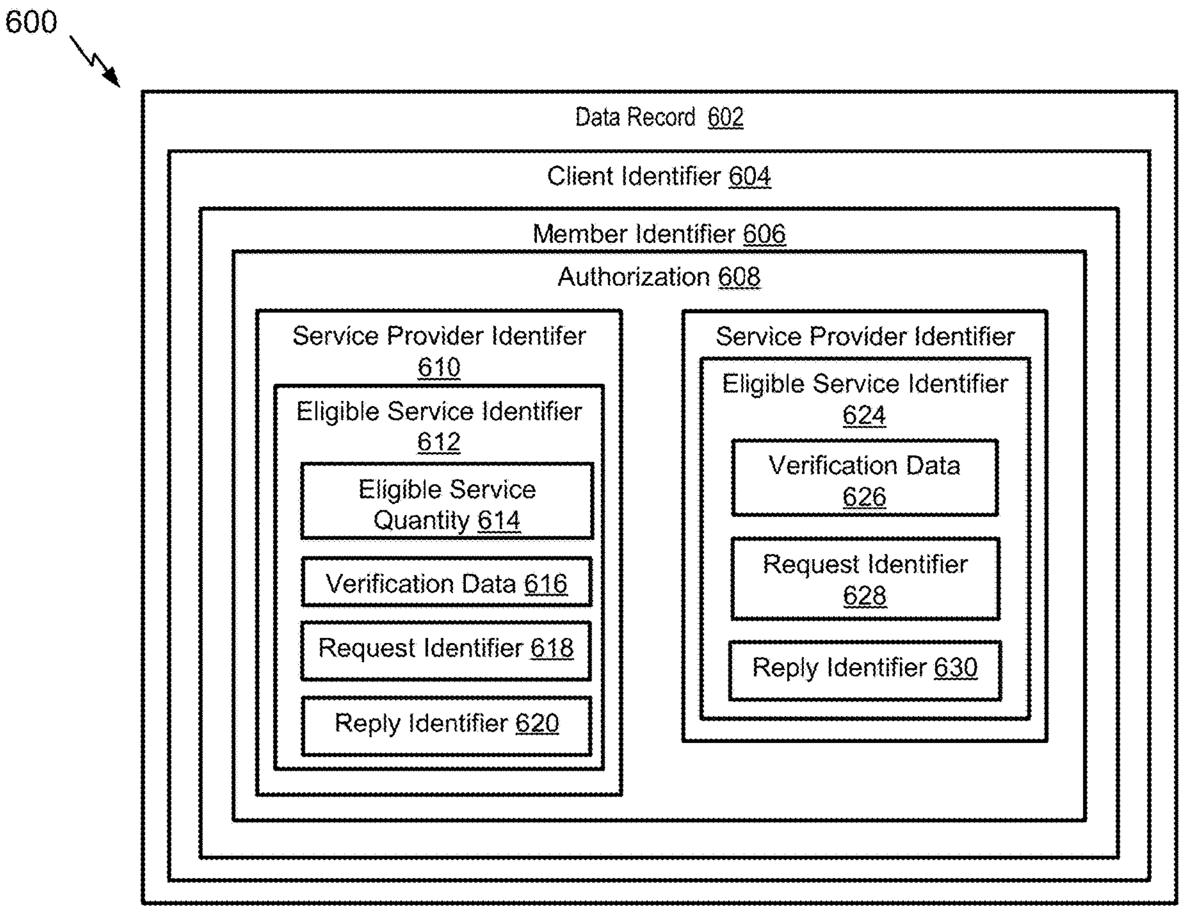
FIG. 6 is a block diagram depicting a data structure configured to facilitate a data coordination operation according to one or more aspects.

FIG. 6 is a block diagram depicting data structure 600 configured to facilitate a data coordination operation according to one or more aspects. Data structure 600 includes data record 602, client identifier 604, member identifier 606, and authorization 608. Client identifier 604 may uniquely identify a client among a plurality of clients. For example and referring to FIG. 1, while a singular client server 124 is depicted, in a typical implementation, a plurality of client servers, each associated with a particular client may be present. Accordingly, client identifier 604 may uniquely distinguish a first client associated with a first client server from a second, third, or nth client associated with a second, third, or nth client server. In an insurance context, each client identifier 604 may uniquely identify a particular insurance company or service payor. Associated with each client identifier 604 may be a unique member identifier 606 associated with a particular member of a plurality of members. Authorization 608 may be associated with unique member identifier 606. For example, authorization 608 may indicate one or more services authorized to be performed on behalf of the member associated with member identifier 606. One or more service provider identifiers 610, 622 may be associated with each authorization 608. For example, service provider identifier 610 may be associated with authorization 608 and may uniquely identify a first service provider authorized to provide a service corresponding to authorization 608. Additionally, service provider identifier 622 also may be associated with authorization 608 and may uniquely identify a second service provider authorized to provide the service corresponding to authorization 608.

Each of service provider identifier 610, 622 may include a plurality of data fields, storing data associated with each service provider corresponding to service provider identifier 612, 622. For instance, service provide identifier 610 includes eligible service identifier 612 uniquely identifying an authorized service to be provided by the service provider associated with service provider identifier 610. Similarly, service provider identifier 622 includes eligible service identifier 624 uniquely identifying an authorized service to be provided by the service provider associated with service provider identifier 622. These services may be distinct. For instance, eligible service identifier 612 may correspond to a first service associated with an authorization 608, while eligible service identifier 624 may correspond to a second service, distinct from the first service associated with authorization 608.

Eligible service identifier 612 may include or be associated with eligible service quantity 614, verification data 616, request identifier 618, and reply identifier 620. For example, eligible service quantity 614 may denote a quantity of the eligible service associated with eligible service identifier 610 authorized to be provided. To illustrate, in a health care context, eligible service quantity 614 may indicate a quantity of physical therapy session associated with an authorized physical therapy service. Verification data 616 may include data indicating whether the service associated with eligible service identifier 612 was actually performed. Request identifier 618 may include data associated with a request for payment for performed services associated with eligible service identifier 612. Reply identifier 620 may include data associated with payment information to effectuate payment for the performed services associated with eligible service identifier 612.

As explained above, eligible service identifier 624 may be associated with a second service that is distinct from the first service associated with eligible service identifier 612. Accordingly, data associated with the second service may be different from data associated with the first service. For example, while the first service associated with eligible service identifier 612 may include quantities of service, such as a quantity of physical therapy sessions, a second service associated with eligible service identifier 624 may be a singular service that cannot be divided in quantities of service. Hence, while eligible service identifier 612 may be associated with eligible service quantity field 614, eligible service identifier 624 may lack such a field.

In an insurance context, client identifier 604 may be associated with a particular insurance company that operates a client server, such as client server 102. Accordingly, a second data record (not depicted) may be associated with a second client identifier (not depicted) that is associated with a second insurance company that operates a second client server.

Member identifier 606 may uniquely identify an insured member of the client to which client identifier 604 corresponds. For instance, member identifier 606 may be a unique value assigned to distinguish a first member and data associated with the first member from a second member and data associated with the second member. Authorization 608 may be an authorization, received from a clinician device associated with a clinician, to authorize performance of a first service performed by a first service provider associated with service provider identifier 610 and a second service performed by a second service provider associated with service provider identifier 622. For instance, the first service may include or correspond to physical therapy services performed at a home of the member, while a second service may include or correspond to a one-time doctor's visit performed at the home of the member. Eligible service identifier 612 may uniquely identify the physical therapy services, while eligible service identifier 622 may uniquely identify the doctor's visit, distinguishing the doctor's visit from the physical therapy services. Eligible service quantity 614 may indicate a quantity of physical therapy services authorized to be performed. Verification data 616, 626 may include, respectively, geolocation data associated with a device of the first service provider and the second service provider, biometric data (such as voice record) of the first service provider and the second service provider, dates and time at which the first service and the second service were performed, or combinations thereof.

Request identifier 618 may be associated with a request, by the first service provider, for payment of at least one session of physical therapy services, while request identifier 628 may be associated with a request, by the second service provider, for payment for a completed doctor's visit. Reply identifier 620 may be associated with a reply, generated by a client server (e.g., client server 124) in response to the request associated with request identifier 618. For instance, assuming that ten physical therapy sessions were authorized, and the request associated with request identifier 618 corresponds to a request for payment for all ten physical therapy sessions but verification data 616 indicates that only one out of the ten physical therapy sessions were completed, the reply associated with reply identifier 620 may correspond to a denial of payment. Conversely, the reply associated with reply identifier 620 may correspond to payment for one of the ten physical therapy sessions, but not payment for the uncompleted or unperformed physical therapy sessions.

Figure 7:
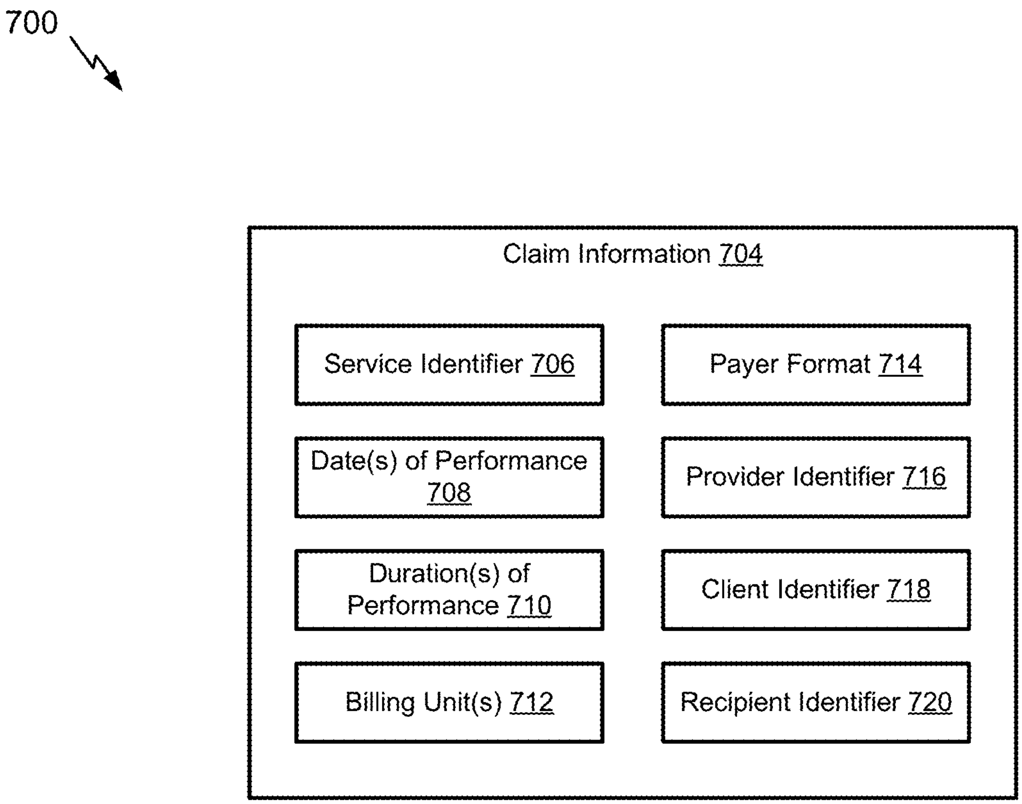
FIG. 7 is a block diagram depicting a data structure configured to facilitate a data coordination operation according to one or more aspects.

FIG. 7 is a block diagram depicting data structure 700 configured to facilitate a data coordination operation according to one or more aspects. The data structure 700 includes claim information 704, which may be an exemplary implementation of claim information 172. The claim information 704 includes a service identifier 706, date(s) of performance 708, duration(s) of performance, billing unit(s) 712, a payer format 714, a provider identifier 716, a client identifier 718, and a recipient identifier 720.

The service identifier 706 may uniquely identify the service for which payment is requested. For example, the service identifier 706 may be an exemplary implementation of one or more of the eligible service identifiers 612, 624. The date(s) of performance 708 may indicate the date and/or time at which performance of the service was at least partially completed. Duration(s) of performance 710 may indicate the time spent performing the service, such as a number of hours. Billing unit(s) 712 may indicate the number of billing unit(s), such as the number of approved hours, for which payment is requested. The payer format 714 may indicate the specified data format or data structure for claims submitted to the payer (e.g., the client). The provider identifier 716 may uniquely identify a company, facility, or individual that provided performance of the service. For example, the provider of the service can include a home health agency, an individual employee such as a nurse or aide, or a combination thereof. The client identifier 718 may uniquely identify the client (e.g., payer) from which payment is requested for the service. For example, the client identifier 718 may be an exemplary implementation of the client identifier 604. The recipient identifier 720 may uniquely identify the recipient of the service (e.g., the member). For example, the recipient identifier 720 may be an exemplary implementation of the member identifier 606.

Figure 8:
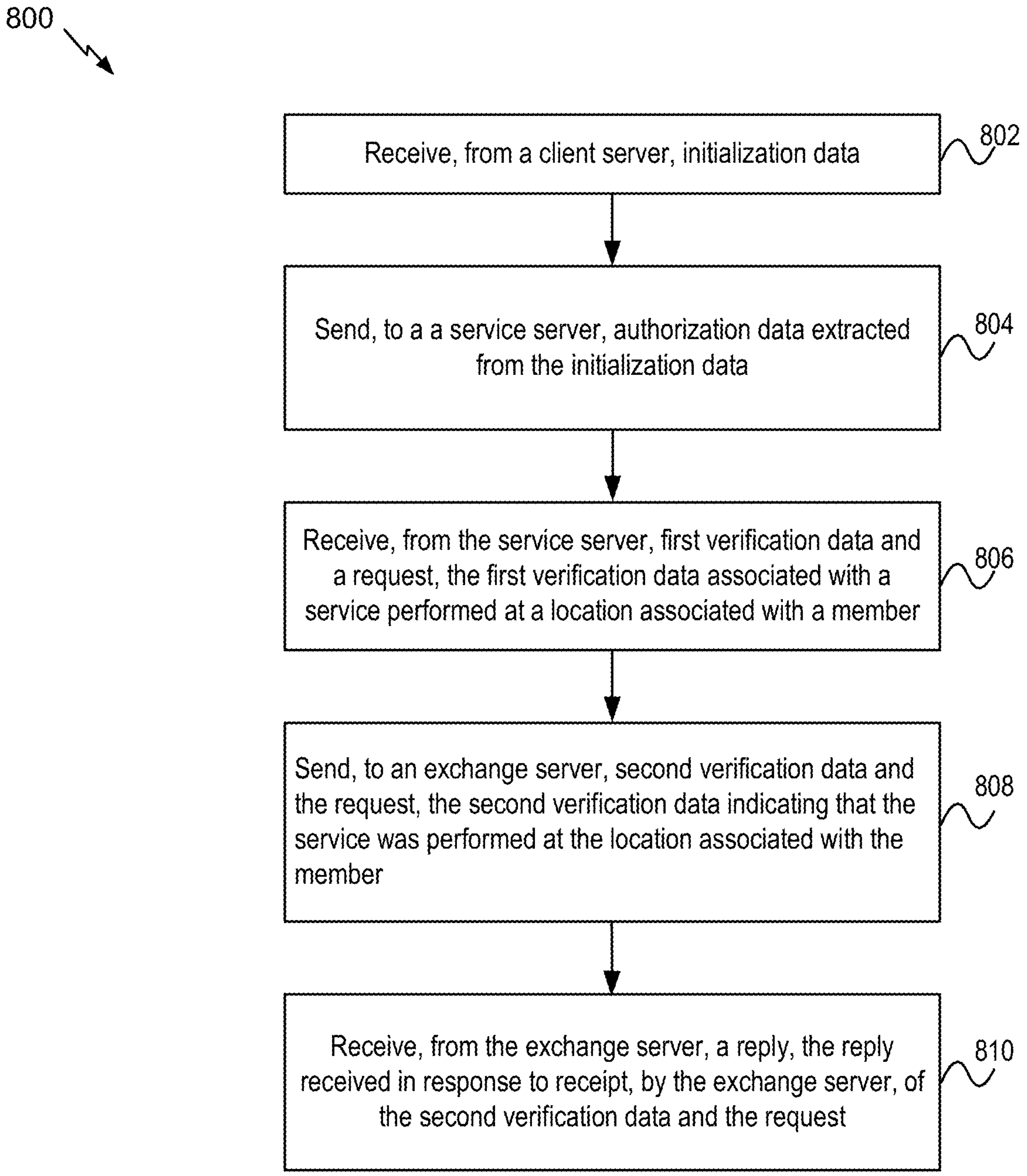
FIG. 8 is a flow diagram illustrating an example process that supports data coordination according to one or more aspects.

FIG. 8 is a flow diagram of an example process 800 that supports data coordination according to one or more aspects. Operations of process 800 may be performed by a coordination server, such as coordination server 116 described above with reference to FIGS. 1-5. For example, example operations of process 800 may enable coordination server 116 to support data coordination operations.

At block 802, a coordination server may receive, from a client server, authorization data associated with a service, the authorization data included in initialization data associated with the service. For example, coordination server 116 may receive authorization data 152 included in initialization data 150 from client server 124.

At block 804, the coordination server may receive, from the service server, first verification data and a request, the first verification data associated with performance of the service and the request including a request for payment for performance of the service. For example, coordination server 116 may receive, from service server 102, verification data 154 and request 158. Verification data 154 may be associated with performance of the service and request 158 may include request for payment for performance of the service.

At block 808, the coordination server may send, to an exchange server, second verification data and the request, the second verification data based on the first verification data. For example, coordination server 116 may send, to exchange server 136, modified verification data 166 generated based on verification data 154.

At block 810, the coordination server may receive, from the exchange server, a reply, the reply received in response to receipt, by the exchange server, of the second verification data and the request. For example, coordination server 116 may receive, from exchange server 136, reply 160, which is received in response to receipt, by exchange server 136, of modified verification data 156 and request 158.

In some implementations, the coordination server sends, to a service server, authorization data based on the initialization data. For example, coordination server 115 may send authorization data 152 to service server 102. Authorization data 152 may be included in or indicated by initialization data 150.

In some implementations, the coordination server parses the initialization data that includes the authorization data. For example, coordination server 115 may parse initialization data 150 that includes or indicates authorization data 152.

In some implementations, the coordination server standardizes the authorization data. For instance, coordination server 116 may standardize authorization data 152. In some implementations, standardizing the authorization data includes standardizing an encoding of the authorization data, a formatting of the authorization data, or both. For example, standardizing authorization data 152 may include standardizing an encoding of authorization data 152, standardizing a formatting of authorization data 152, or both.

In some implementations, the initialization data includes the authorization data, member census data, service provider census data, service data, or a combination thereof. For example, initialization data 150 may include authorization data 152, member census data 506, service provider census data 504, service data 508, or a combination thereof.

In some implementations, the authorization data indicates authorization for performance of the service, the member census data indicates that an entity for whom the service is to be performed is an enrolled member, the service provider census data indicates that a provider of the service is an enrolled service provider, and the service data indicates that the service is included among one or more authorized services. For example, authorization data 152 may indicates authorization for performance of the service, member census data 506 may indicate that an entity for whom the service is to be performed is an enrolled member, service provider census data 504 may indicate that a provider of the service is an enrolled service provider, and service data 508 may indicate that the service is included among one or more authorized services.

In some implementations, the coordination sever generates the second verification data based on the first verification data. For example, coordination server 116 may generate modified verification data 156 based on verification data 154. Moreover, in some implementations, the coordination server standardizes the second verification data, the request, or both. Standardizing the second verification data, the request, or both includes standardizing an encoding of the second verification data, the request, or both, standardizing a formatting of the second verification data, the request, or both, or a combination thereof. For example, coordination server 116 may standardize modified verification data 156, request 158, or both by standardizing an encoding of modified verification data 156, request 158, or both, standardizing a formatting of modified verification data 156, request 158, or both, or a combination thereof. In the context of health insurance, coordination server 116 may standardize request 158 by converting request 158 into the insurance-industry standard "837" insurance claim.

In some implementations, the coordination server verifies, based on service data included in the initialization data, that the service constitutes an eligible service. For example, coordination server 116 may be configured to verify, based on service data 508, that the service constitutes an eligible service. To elaborate, service data 508 may include identifiers associated with a plurality of eligible services, and coordination server 116 may be configured to compare an identifier included in authorization data 152, initialization data 150, or both with the identifiers associated with the plurality of eligible services to determine whether a service constitutes an eligible service.

In some implementations, the coordination server verifies, based on the first verification data, that at least a portion of the service has been completed. For example, verification data 154 may include an indicator to indicate that one or more components of a service authorized via authorization data 152 has been completed. To illustrate, a service authorized via authorization data 152 may include performance of a plurality of courses of physical therapy to be performed at a home of the member. Verification data 152 may indicate that one or more of the courses of physical therapy have bene completed. Hence, based on verification data 152, coordination server 116 may verify that at least a portion of the service has been completed.

In some implementations, the coordination server sends, to the exchange server, the request in response to verifying that the service constitutes the eligible service and that at least the portion of the service has been completed. For example, coordination server 116 may send, to exchange server 136, request 158 in response to verifying, that the service constitutes the eligible service and that at least the portion of the service has been completed.

In some implementations, the coordination server receives, from the exchange server, a reply in response to receipt, by the exchange server, of the request. For example, coordination server 116 may receive, from exchange server 136, reply 160 in response to receipt, by exchange server 136, of request 158.

In some implementations, the coordination server sends, to the service server, the reply. For example, coordination server 116 may send, to service server 102, reply 160. In some implementations, the coordination server may standardize a formatting, an encoding, or both of the reply. For example and in the health insurance context, coordination server 116 may convert reply 160 into the health-insurance industry standard "835."

In some implementations, the first verification data includes a plurality of indicators. For example, verification data 154 may include a plurality of indicators. In some implementations, a first indicator of the plurality of indicators identifies whether the service was completed, a second indicator of the plurality of indicators identifies personnel who performed the service, a third indicator of the plurality of indicators includes geolocation data identifying the location at which the service was performed, a fourth indicator of the plurality of indicators includes an identifier identifying the service to distinguish the service from among a plurality of other services, a fifth indicator indicates a timeframe corresponding to performance of the service, a sixth indicator indicates a portion of the services that have been completed, or a combination thereof.

In some implementations, the coordination server generates the second verification data based on the first verification data. For example, coordination server 116 generates modified verification data 156 based on verification data 154.

In some implementations, to generate the second verification data, the coordination server extracts all indicators of the plurality of indicators except for the first indicator, the sixth indicator, or a combination thereof. For example, to generate modified verification data 166, coordination server 116 extracts all indicators of the plurality of indicators except for the first indicator identifying whether the service was completed, the sixth indicator indicating a portion of the services that have been completed, or a combination thereof.

In some implementations, the coordination server receives, from a second client server, second authorization data included in second initialization data. For example, coordination server 116 may receive from a second client server of a plurality of client servers, second authorization data included in or indicated by the second initialization data.

In some implementations, a first formatting, a first encoding, or both of the authorization data is different from a second formatting, a second encoding, or both of the second authorization data. For example, a first formatting, a first encoding, or both of authorization data 152 may be different from a second formatting, a second encoding, or both of the second authorization data.

In some implementations, the coordination server standardizes the second authorization data by standardizing the second formatting, the second encoding, or both. For instance, client server 116 may standardize the second authorization data by standardizing the second formatting, the second encoding, or both. In this manner, the second authorization data may be parsed by or used by any device regardless of the operating system that the device executes.

In some implementations, after standardizing the second authorization data, the client server sends the second authorization data to the service server. For example, after standardizing the second authorization data, client server 116 may send the second authorization data to service server 102.

In some implementations, the coordination server receives, from the service server, third verification data. For example, coordination server 116 may receive, from service server 102, third verification data, such as in response to sending the second authorization data to service server 102. The third verification data may include data to indicate that a second service associated with the second authorization data has been performed. For instance, the third verification data may include geolocation data of a location at which the second service was performed, an identity of personnel who performed the second service, biometric data associated with personnel who performed the second service, or any combination thereof.

In some implementations, the coordination server generates, from the third verification data, fourth verification data. For example, coordination server 116 may generate, from the third verification data, fourth verification data. The fourth verification data may indicate that the second service was completed or not, a quantity of the second service that was completed if performed, or a combination thereof.

In some implementations, the coordination server standardizes the fourth verification data. For instance, coordination server 116 standardizes the fourth verification data by standardizing a formatting, an encoding, or both of the fourth verification data.

In some implementations, the coordination server sends the fourth verification data to the exchange server. For example, coordination server 116 may send the fourth verification data to exchange server 136.

In some implementations, the coordination server receives, from the service server, a third request in response to sending the second authorization data. For example, coordination server 116 may receive, from service server 120, a third request in response to sending the second authorization data to the service server 102. The third request may include or correspond to a request associated with the second service, such as a request for payment for completion of the second service.

In some implementations, the coordination server standardizes the second request. For instance, coordination server 116 standardizes the second request by standardizing a formatting, an encoding, or both of the second request.

In some implementations, the coordination server sends the second request to the exchange server. For example, coordination server 116 may send the second request to exchange server 136.

In some implementations, in response to sending the second request, the coordination server receives a second reply from the exchange server, the second reply generated by the client server. For instance, in response to sending the second request, coordination server 116 may receive a second reply from exchange server 136, the second reply generated by client server 124. The second reply may be in response to the second request and may indicate a denial of payment for alleged completion of the second service or may include payment information for completion of the second service. Other transaction-related data also may be included in the second reply.

Figure 9:
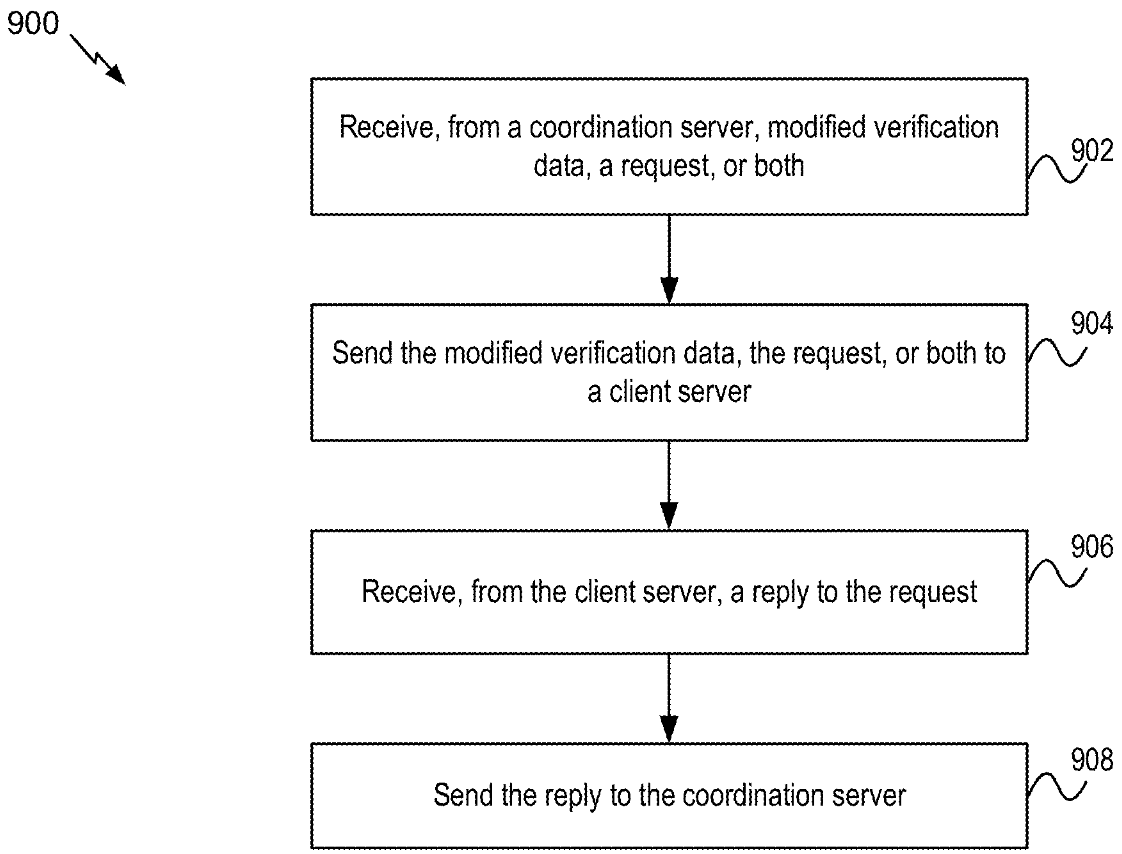
FIG. 9 is a flow diagram illustrating an example process that supports data coordination according to one or more aspects.

FIG. 9 is a flow diagram of an example process 900 that supports data homogenization and simplification according to one or more aspects. Operations of process 900 may be performed by an exchange server, such as exchange server 136 described above with reference to FIGS. 1-5. For example, example operations of process 900 may enable exchange server 136 to support data homogenization and simplification.

At block 902, the exchange server receives, from a coordination server, modified verification data, a request, or both. For example, exchange server 136 may receive, from coordination server 116, modified verification data 156, request 158, or both.

At block 904, the exchange server sends the modified verification data, the request, or both to a client server. For example, exchange server 136 sends modified verification data 156, request 158, or both to client server 124.

At block 906, the exchange server receives, from the client server, a reply to the request. For instance, exchange server 136 receives, from client server 134, reply 160 to request 158.

At block 908, the exchange server sends the reply to the coordination server. For example, exchange server 136 sends reply 160 to the coordination server 116. In some implementations, the exchange server is configured to standardize the modified verification data, the request, the reply, or any combination thereof assuming that any one of the foregoing is not already standardized. To standardize the modified verification data, the request, the reply, or any combination thereof, the exchange server may be configured to standardize an encoding, a formatting, or both of the modified verification data, the request, the reply, or any combination thereof.

Figure 10:
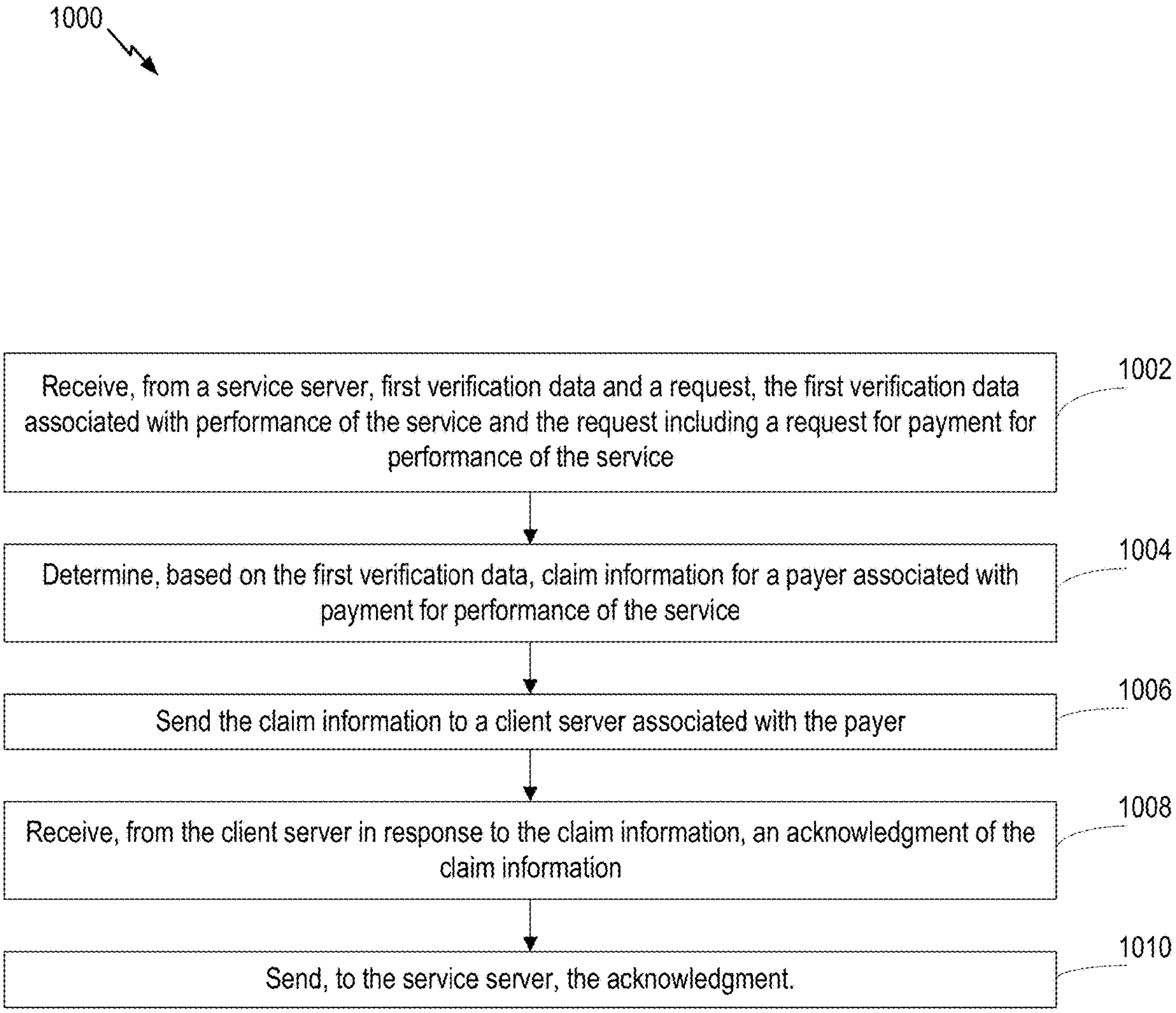
FIG. 10 is a flow diagram illustrating an example process that supports data coordination according to one or more aspects.

FIG. 10 is a flow diagram of an example process 1000 that supports data homogenization and simplification according to one or more aspects. Operations of process 1000 may be performed by a coordination server, such as coordination server 116 described above with reference to FIGS. 1-5. For example, example operations of process 900 may enable coordination server 116 to support data coordination operations.

The process 1000 includes receiving, from a service server, first verification data and a request (block 1002). For example, the coordination server 116 may receive, from a service server 102, first verification data 154 and a request 158. The first verification data 154 may be associated with performance of a service and the request 158 may include a request for payment for performance of the service. In certain implementations, the service may be a home health care service with electronic visit verification.

The process 1000 includes determining, based on the first verification data, claim information for a payer associated with payment for performance of the service (block 1004). For example, the coordination server 116 may determine, based on the first verification data 154, claim information 172 for a payer associated with payment for performance of the service. In certain implementations, the first verification data 154 may include an authorization identifier for the service. In such instances, the claim information 172 may include the authorization identifier for the service. In certain implementations, the claim information 172 may include information comprising a service identifier for the service, one or more dates of performance of the service, one or more durations of performance of the service, one or more authorized units for the service, a payer format associated with the payer, an identifier of a provider of the service, an identifier of a client of the service, or a combination thereof. In certain implementations, determining the claim information 172 includes determining a number of authorized units of the service have been performed based on the first verification data 154. In certain implementations, the method 1000 may further include verifying, based on the first verification data 154, that at least a portion of the service has been completed. In such instances, the claim information 172 may be determined in response to determining that at least the portion of the service has been completed. In certain implementations, a first formatting, a first encoding, or both of the first verification data 154 may be different from a second formatting, a second encoding, or both of the claim information 172. In such instances, determining the claim information 172 may include converting at least a portion of the first verification into the second formatting, the second encoding, or a combination thereof. In certain implementations, the method 1000 may further include determining the payer based on the first verification data 154, and selecting the second formatting, the second encoding, or both based on the payer.

The process 1000 includes sending the claim information to a client server associated with the payer (block 1006). For example, the coordination server 116 may send the claim information 172 to a client server 124 associated with the payer.

The process 1000 includes receiving, from the client server in response to the claim information, an acknowledgment of the claim information (block 1008). For example, the coordination server 116 may receive, from the client server 124 in response to the claim information 172, an acknowledgment 174 of the claim information 172.

The process 1000 includes sending, to the service server 102, the acknowledgment. (block 1010). For example, the coordination server 116 may send, to the service server 102, the acknowledgment 174. In certain implementations, the acknowledgment 174 may be in the second formatting, the second encoding, or both. In such instances, sending the acknowledgment 174 to the service server 102 may include determining a modified acknowledgment 178 in the first formatting, the first formatting, or both, and sending the modified acknowledgment 178 to the service server 102.

In certain implementations, the process 1000 further includes receiving, from the client server 124, acknowledgment 174 that performance of the service was completed, and the claim information 172 may be determine based on receiving the acknowledgment 174.

In some implementations, the process 1000 may further include receiving, from the client server 124, payment information 176, where the payment information 176 indicates that payment has been processed for performance of the service. In such instances, the method 1000 may further include, sending, to the service server 102, the payment information 176.

In some implementations, determining the claim information 172 and sending the claim information 172 to the client server 124 may be performed in real time after receiving the first verification data 154.

In some implementations, the first verification information may include verification for a plurality of services. In such instances, determining the claim information 172 may include determining separate claim information 172 for each of the plurality of services.

Certain features that are described in this specification in the context of separate implementations also can be implemented in combination in a single implementation. Conversely, various features that are described in the context of a single implementation also can be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

Those of skill in the art would understand that information, message, and signals may be represented using any of a variety of different technologies and techniques. For example, data, instructions, commands, information, and signals that may be referenced throughout the above description may be represented by voltages, currents, electromagnetic waves, magnetic fields or particles, optical fields or particles, or any combination thereof.

Components, the functional blocks, and the modules described herein with the figures include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. The various illustrative logics, logical blocks, modules, circuits and algorithm processes described in connection with the implementations disclosed herein may be implemented as electronic hardware, computer software, or combinations of both. In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Additionally, the operations of a method or algorithm may reside as one or any combination or set of codes and instructions on a machine readable medium and computer-readable medium, which may be incorporated into a computer program product.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. Unless stated otherwise, the word or as used herein is an inclusive or and is interchangeable with "and/ or," such that when "or" is used in a list of two or more items, means that any one of the listed items can be employed by itself, or any combination of two or more of the listed items can be employed. To illustrate, A, B, or C includes: A alone, B alone, C alone, a combination of A and B, a combination of A and C, a combination of B and C, or a combination of A, B, and C. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing"). As a result, an apparatus that "comprises," "has," "includes," or "contains" one or more elements possesses those one or more elements, but is not limited to possessing only those one or more elements. Likewise, a method that "comprises," "has," "includes," or "contains" one or more steps possesses those one or more steps, but is not limited to possessing only those one or more steps.

Any implementation of any of the systems, methods, and article of manufacture can consist of or consist essentially of—rather than comprise/have/include—any of the described steps, elements, or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

The claims are not intended to include, and should not be interpreted to include, means-plus- or step-plus-function limitations, unless such a limitation is explicitly recited in a given claim using the phrase(s) "means for" or "step for," respectively.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure and following claims are not intended to be limited to the examples and designs described herein but is to be accorded the widest scope consistent with the principles and novel features disclosed herein.

What is claimed is:

1. A method performed by a coordination server to coordinate data exchange among a plurality of devices, the method comprising:

receiving, from a service server, first verification data and a request, the first verification data associated with performance of a service and the request associated with payment for performance of the service;

verifying, based on the first verification data, that at least a portion of the service has been completed;

determining, in response to determining that at least the portion of the service has been completed and based on the first verification data, claim information for a payer associated with payment for performance of the service;

sending the claim information to a client server associated with the payer, wherein the client server is distinct from the service server;

receiving, from the client server in response to the claim information, an acknowledgment of the claim information; and sending, to the service server, the acknowledgment received from the client server.

2. The method of claim 1, further comprising:

receiving, from the client server, payment information, wherein the payment information indicates that payment has been processed for performance of the service; and sending, to the service server, the payment information.

3. The method of claim 1, further comprising receiving, from the client server, acknowledgment that performance of the service was completed, wherein the claim information is determined based on receiving the acknowledgment.

4. The method of claim 1, wherein the first verification includes an authorization identifier for the service, wherein the claim information includes the authorization identifier for the service.

5. The method of claim 4, wherein the claim information comprises a service identifier for the service, one or more dates of performance of the service, one or more durations of performance of the service, one or more billing units for the service, a payer format associated with the payer, an identifier of a provider of the service, an identifier of a client of the service, or a combination thereof.

6. The method of claim 1, wherein a first formatting, a first encoding, or both of the first verification data is different from a second formatting, a second encoding, or both of the claim information, and wherein determining the claim information comprises converting at least a portion of the first verification into the second formatting, the second encoding, or a combination thereof.

7. The method of claim 6, further comprising:

determining the payer based on the first verification data; and selecting the second formatting, the second encoding, or both based on the payer.

8. The method of claim 6, wherein the acknowledgment is in the second formatting, the second encoding, or both, and wherein sending the acknowledgment to the service server comprises:

determining a modified acknowledgment in the first formatting, the first encoding, or both; and sending the modified acknowledgment to the service server.

9. The method of claim 1, wherein determining the claim information and sending the claim information to the client server is performed in real time after receiving the first verification data.

10. The method of claim 1, wherein the first verification data includes verification for a plurality of services, and wherein determining the claim information includes determining separate claim information for each of the plurality of services.

11. The method of claim 1, wherein the service server is operated by a service provider of the service, and wherein the service provider is distinct from the payer.

12. A system for coordinating data exchange among a plurality of devices, the system comprising:

a processing system that includes one or more processors and one or more memories coupled with the one or more processors, the processing system configured to:

receive, from a service server, first verification data and a request, the first verification data associated with performance of a service and the request associated with payment for performance of the service;

verify, based on the first verification data, that at least a portion of the service has been completed;

determine, in response to determining that at least the portion of the service has been completed and based on the first verification data, claim information for a payer associated with payment for performance of the service;

send the claim information to a client server associated with the payer, wherein the client server is distinct from the service server;

receive, from the client server in response to the claim information, an acknowledgment of the claim information; and send, to the service server, the acknowledgment received from the client server.

13. The system of claim 12, wherein the processing system is further configured to:

receive, from the client server, payment information, wherein the payment information indicates that payment has been processed for performance of the service; and send, to the service server, the payment information.

14. The system of claim 12, wherein the processing system is further configured to receive, from the client server, acknowledgment that performance of the service was completed, wherein the claim information is determined based on receiving the acknowledgment.

15. The system of claim 12, wherein determining the claim information comprises determining a number of authorized units of the service have been performed based on the first verification data.

16. The system of claim 12, wherein a first formatting, a first encoding, or both of the first verification data is different from a second formatting, a second encoding, or both of the claim information, and wherein determining the claim information comprises converting at least a portion of the first verification into the second formatting, the second encoding, or a combination thereof.

17. The system of claim 16, wherein the processing system is further configured to:

determine the payer based on the first verification data; and select the second formatting, the second encoding, or both based on the payer.

18. A non-transitory computer-readable medium storing instructions that, when executed by a processor, cause the processor to:

receive, from a service server, first verification data and a request, the first verification data associated with performance of a service and the request associated with payment for performance of the service;

verify, based on the first verification data, that at least a portion of the service has been completed;

determine, in response to determining that at least the portion of the service has been completed and based on the first verification data, claim information for a payer associated with payment for performance of the service;

send the claim information to a client server associated with the payer, wherein the client server is distinct from the service server;

receive, from the client server in response to the claim information, an acknowledgment of the claim information; and send, to the service server, the acknowledgment received from the client server.

19. The non-transitory computer-readable medium of claim 18, wherein the acknowledgment indicates one or more of:

at least a portion of the claim information;

a timestamp associated with the claim information;

an error code associated with a claim that is associated with the claim information;

payer-specific processing information associated with the claim; or an estimated time for adjudication of the claim.

* * * * *